United States Patent
Huang et al.

(10) Patent No.: US 10,468,032 B2
(45) Date of Patent: Nov. 5, 2019

(54) METHOD AND SYSTEM OF SPEAKER RECOGNITION USING CONTEXT AWARE CONFIDENCE MODELING

(71) Applicant: Intel Corporation, Santa Clara, CA (US)

(72) Inventors: Jonathan J. Huang, Pleasanton, CA (US); Gokcen Cilingir, Sunnyvale, CA (US); Tobias Bocklet, Munich (DE)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 15/483,246

(22) Filed: Apr. 10, 2017

(65) Prior Publication Data

US 2018/0293988 A1   Oct. 11, 2018

(51) Int. Cl.
| | | |
|---|---|---|
| *G10L 17/00* | (2013.01) | |
| *G10L 17/12* | (2013.01) | |
| *G10L 17/20* | (2013.01) | |
| G10L 17/04 | (2013.01) | |
| G10L 25/51 | (2013.01) | |

(52) U.S. Cl.
CPC .............. *G10L 17/12* (2013.01); *G10L 17/20* (2013.01); *G10L 17/04* (2013.01); *G10L 25/51* (2013.01)

(58) Field of Classification Search
CPC ......... G10L 17/00; G10L 25/78; G10L 15/00; G10L 15/08; G10L 17/005; G10L 21/0208; G10L 25/03; G10L 2025/786; G10L 21/02; G10L 21/0272; G10L 25/75; G10H 1/366

See application file for complete search history.

(56) References Cited

U.S. PATENT DOCUMENTS

| | | | | |
|---|---|---|---|---|
| 7,260,527 B2* | 8/2007 | Koshiba | ............... | G10L 15/20 704/233 |
| 7,778,831 B2* | 8/2010 | Chen | ................... | G10L 15/065 704/207 |
| 8,000,962 B2* | 8/2011 | Doyle | ................... | G10L 15/20 704/240 |
| 8,050,922 B2* | 11/2011 | Chen | ................... | G10L 15/065 704/207 |
| 8,190,430 B2* | 5/2012 | Doyle | ................... | G10L 15/20 704/240 |
| 8,639,508 B2* | 1/2014 | Zhao | ..................... | G10L 15/08 379/88.01 |

(Continued)

FOREIGN PATENT DOCUMENTS

WO   2015076828   5/2015

OTHER PUBLICATIONS

Richiardi, Jones et al., "Confidence and reliability measures in speaker verification", www.sciencedirect.com; Signal Processing Institute, Swiss Federal Institute of Technology Lausanne, EPFL-STI-ITS-LIDIAP, ELD 243, Station 11, 1015 Lausanne, Switzerland.

(Continued)

*Primary Examiner* — Edgar X Guerra-Erazo
(74) *Attorney, Agent, or Firm* — Green, Howard & Mughal LLP.

(57) ABSTRACT

Techniques related to speaker recognition are discussed. Such techniques include determining context aware confidence values formed of false accept and false reject rates determined by using adaptively updated acoustic environment score distributions matched to current score distributions.

23 Claims, 13 Drawing Sheets

(56) References Cited

U.S. PATENT DOCUMENTS

| | | | | |
|---|---|---|---|---|
| 9,208,782 | B2* | 12/2015 | Nakadai | G10L 15/20 |
| 9,792,907 | B2 | 10/2017 | Bocklet et al. | |
| 9,947,324 | B2* | 4/2018 | Tsujikawa | G10L 17/06 |
| 9,972,322 | B2* | 5/2018 | Biswal | G10L 15/20 |
| 10,043,521 | B2 | 8/2018 | Bocklet et al. | |
| 2006/0265223 | A1* | 11/2006 | Doyle | G10L 15/08 |
| | | | | 704/240 |
| 2009/0119103 | A1* | 5/2009 | Gerl | G10L 17/04 |
| | | | | 704/243 |
| 2009/0171660 | A1* | 7/2009 | Jian | G10L 17/20 |
| | | | | 704/246 |
| 2010/0204993 | A1* | 8/2010 | Vogt | G10L 17/06 |
| | | | | 704/250 |
| 2012/0004912 | A1* | 1/2012 | Doyle | G10L 15/08 |
| | | | | 704/240 |
| 2012/0209609 | A1* | 8/2012 | Zhao | G10L 15/08 |
| | | | | 704/249 |
| 2013/0225128 | A1* | 8/2013 | Gomar | H04W 12/06 |
| | | | | 455/411 |
| 2015/0012268 | A1* | 1/2015 | Nakadai | G10L 15/20 |
| | | | | 704/233 |
| 2017/0287490 | A1 | 10/2017 | Biswal et al. | |
| 2018/0082692 | A1* | 3/2018 | Khoury | G10L 17/02 |
| 2018/0366124 | A1 | 12/2018 | Cilingir et al. | |
| 2019/0027152 | A1 | 1/2019 | Huang et al. | |

OTHER PUBLICATIONS

Villalba, Jesus et al., "Analysis of speech quality measures for the task of estimating the reliability of speaker verification decisions", www.sciencedirect.com; www.elsevier.com/locate/specom; Speech Communication 78 (2016) 42-61.

Ratnam, et al., "Blind estimation of reverberation time", Journal of Acoustical Society of America; vol. 114; No. 4; pp. 2877-2892; Nov. 2003.

Reynolds, et al., "Speaker Verification Using Adapted Gaussian Mixture Models", Digital Signal Processing; vol. 10; pp. 19-41; 2000.

Wen, et al., "Blind Estimation of Reverberation Time Based on the Distribution of Signal Decay Rates", ICASSP, 2008; pp. 329-332.

* cited by examiner

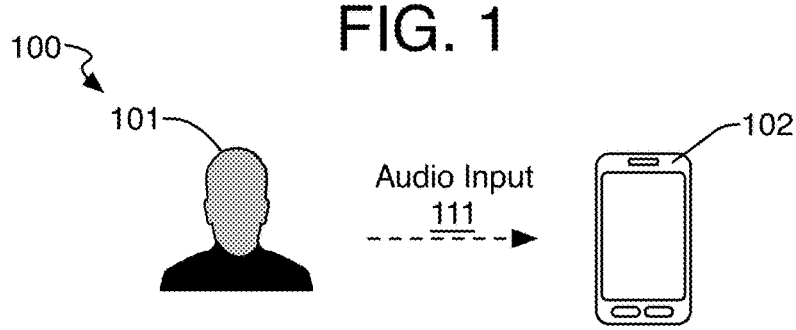
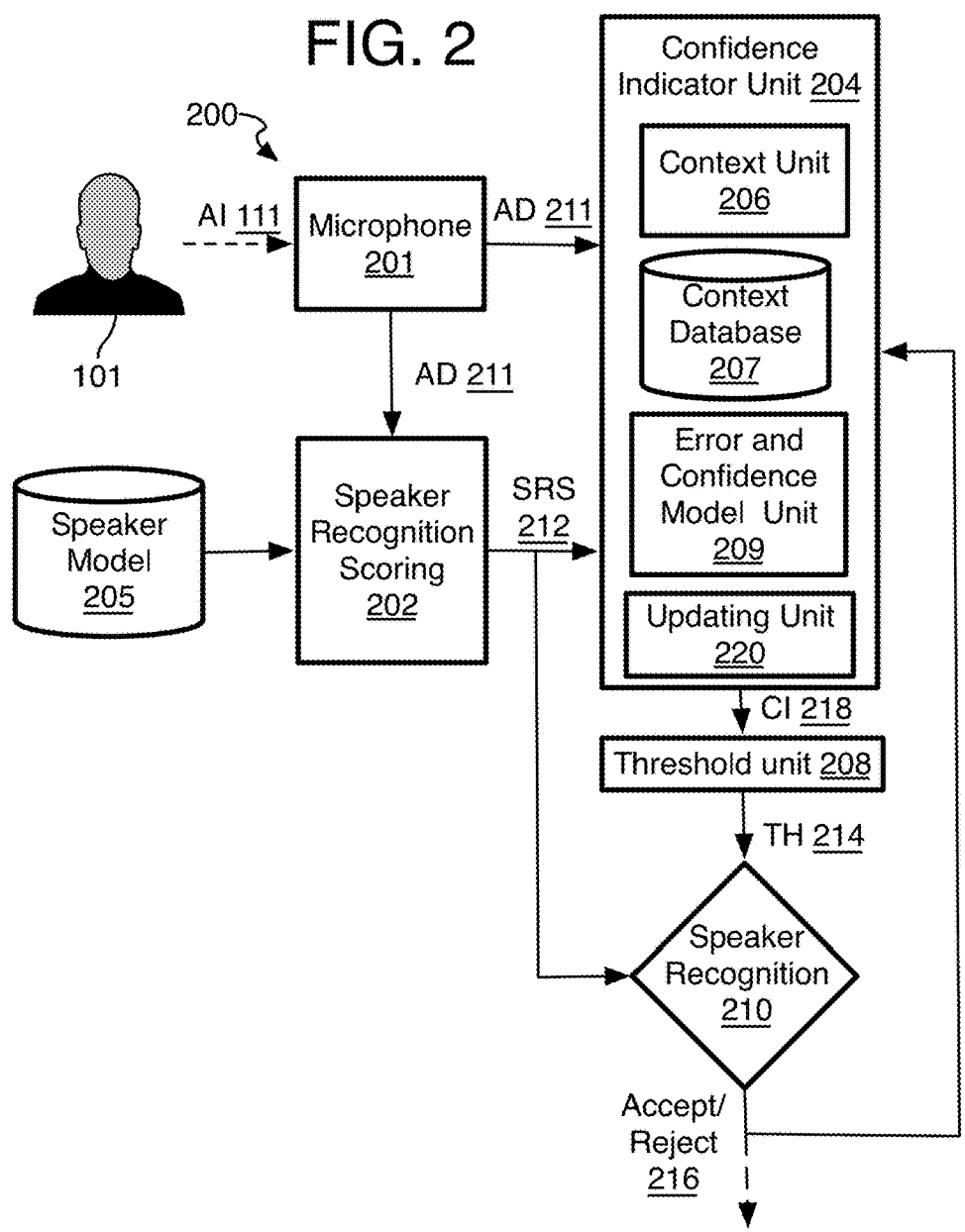

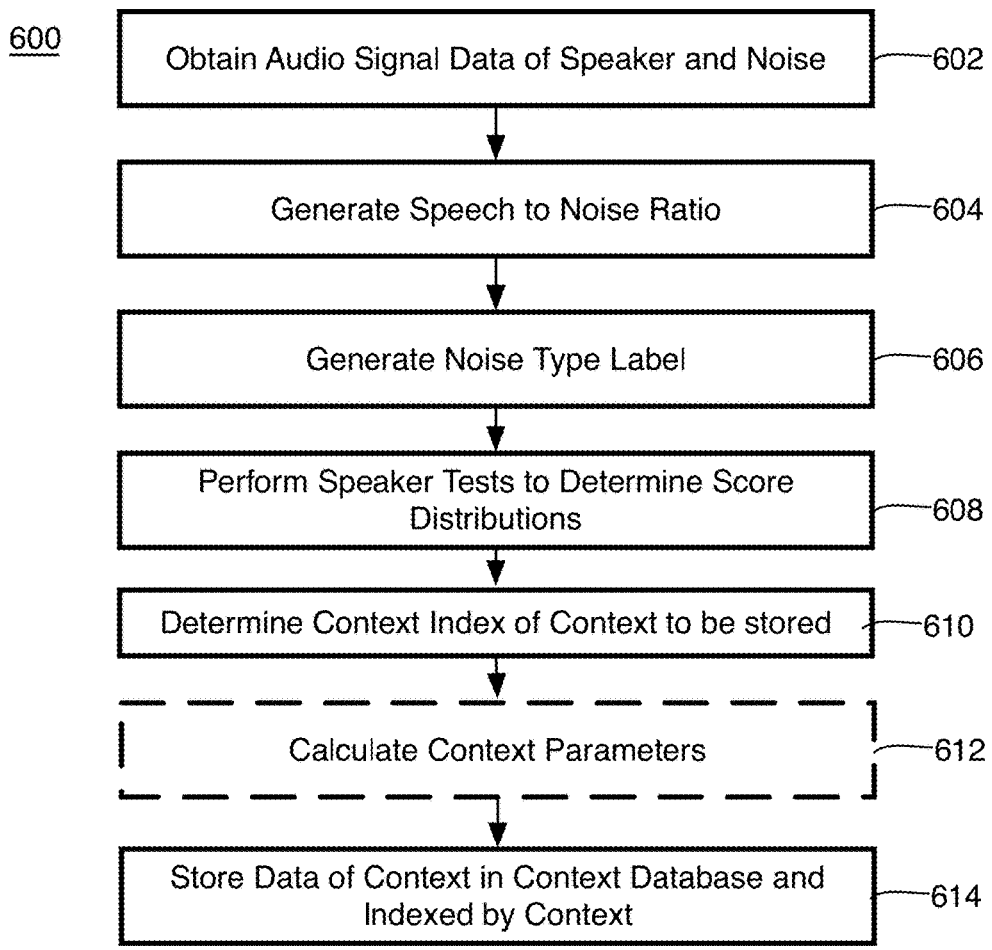

Enroll: Clean, Test: Car 9

Enroll: Clean, Test: Side Music 9

Enroll: Clean, Test: Side Speaker 9

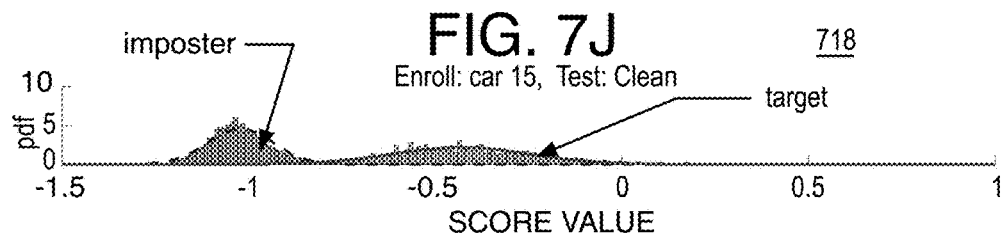
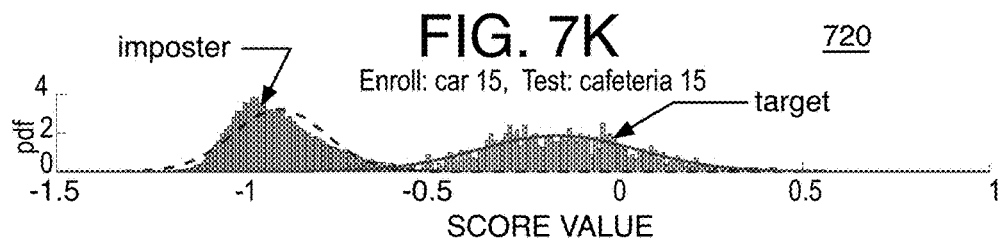
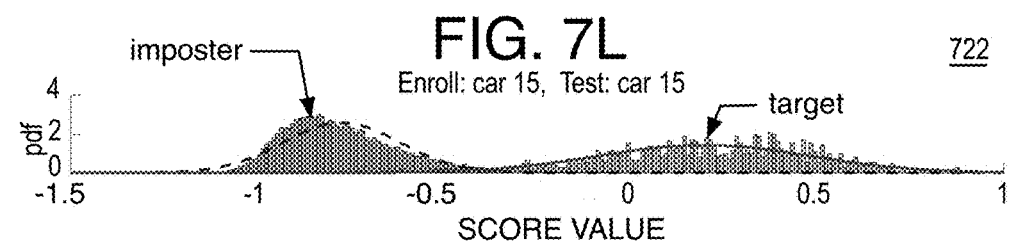
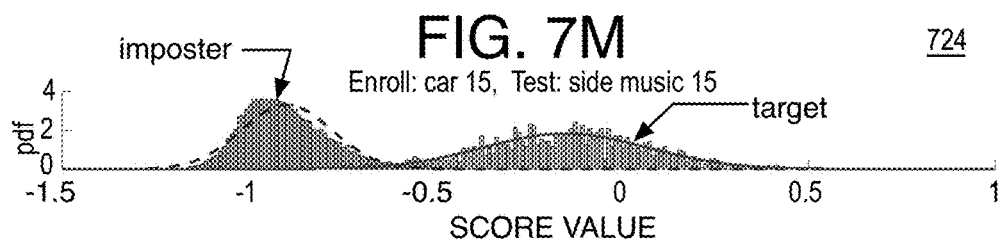
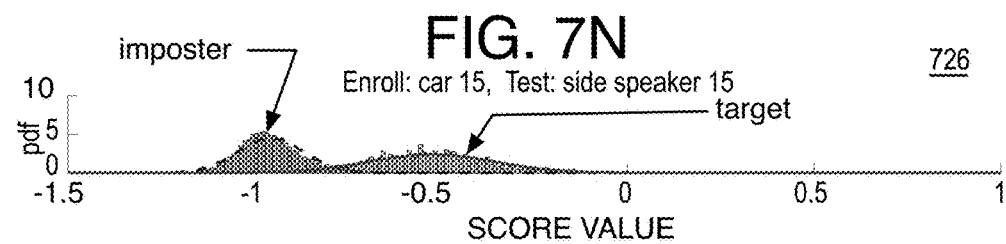
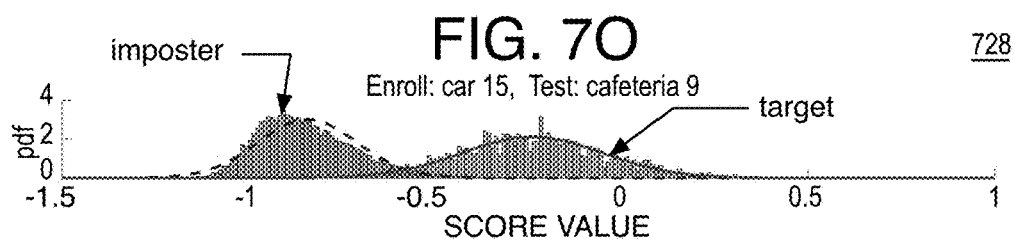

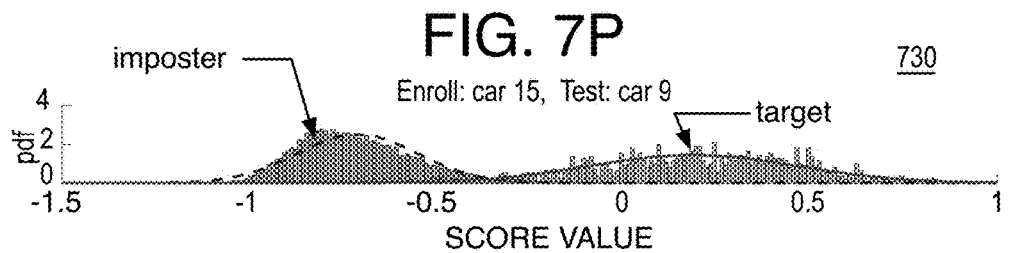
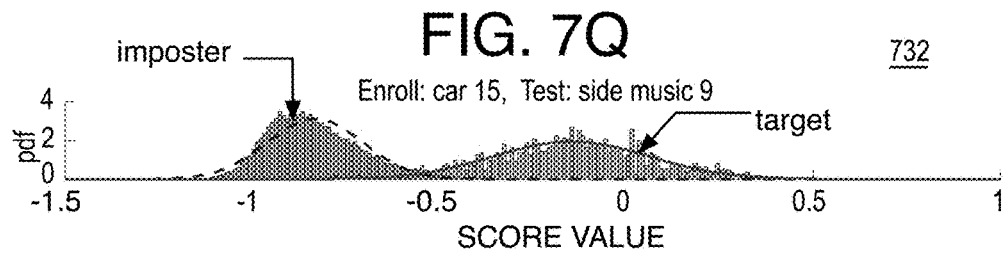
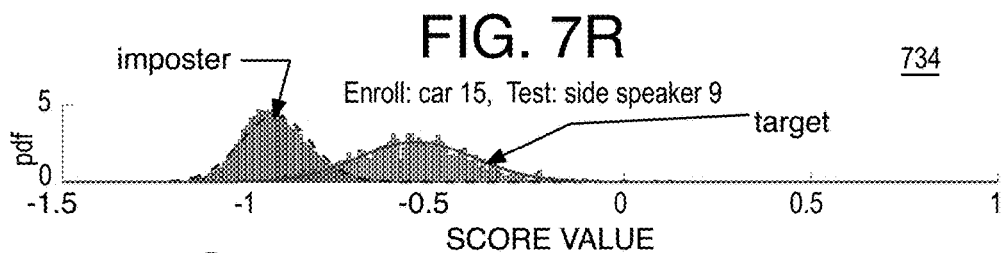
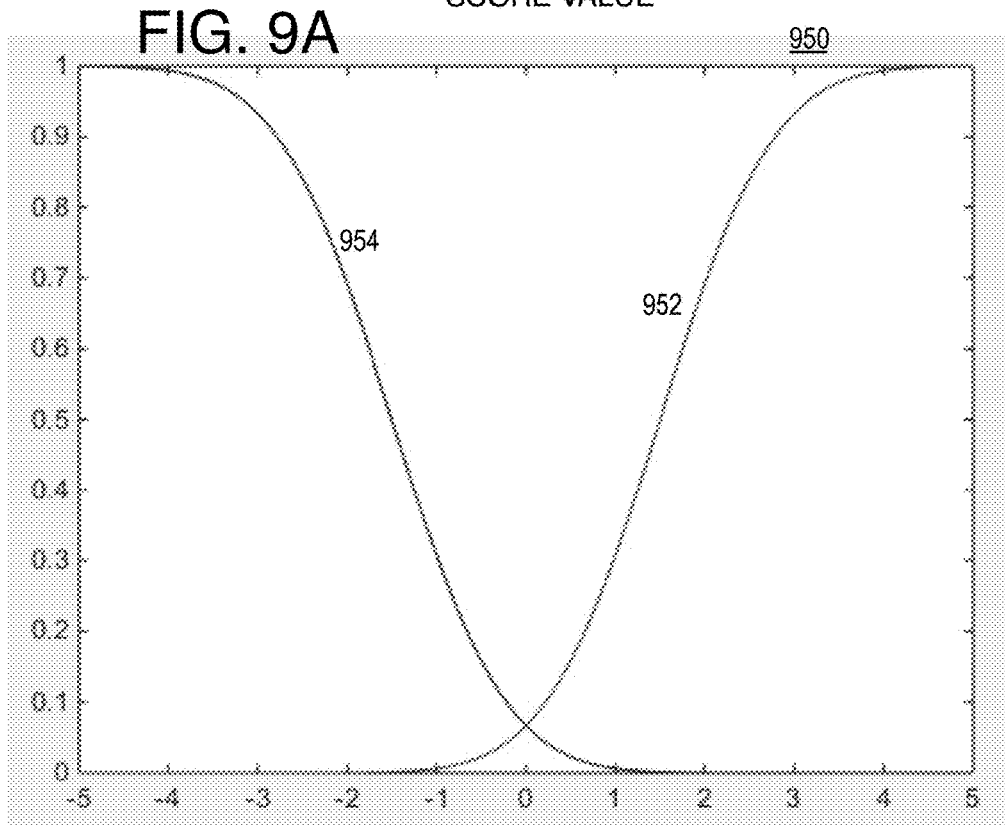

METHOD AND SYSTEM OF SPEAKER RECOGNITION USING CONTEXT AWARE CONFIDENCE MODELING

BACKGROUND

Speaker (or voice) recognition is an important application that may provide new modalities for multifactor biometric device login or authentication. Furthermore, speaker recognition may transform speech applications from generic to personalized by recognizing particular speakers from a group or the like. For example, recognizing particular speakers from a group may provide for improved speech transcription (e.g., as the transcription of the speaker may then be based on the particular characteristics of that speaker), associating particular portions of a transcription with the speakers that uttered the portions, or the like.

A variety of techniques may be employed to perform speaker recognition. For example, in the case of speaker verification, where a claimed identity may be evaluated and verified as the correct or true (or target) speaker rather than the wrong speaker (or imposter) based on a spoken utterance, the speaker verification system may use a speaker model to generate a score that represents the likelihood that the speaker is the true speaker and is based on the utterance. The speaker verification system may then compare the score to a threshold, which may quantify the minimum similarity required for a positive verification of the utterance. For example, the threshold may provide a balance between false rejection and false acceptance. A false acceptance occurs when the imposter is erroneously approved or verified. A false rejection occurs when the true speaker is erroneously rejected. Choosing the correct threshold, however, has proven to be very difficult due to a number of factors including noisy conditions that require varying threshold levels. Often, however, the thresholds are set empirically and are based on acceptable and empirically formed false accept and false reject rates obtained from host or end applications. These applications will permit speaker access depending on the recognition decision (accept or reject) upon comparison of the threshold to the speaker score. Such a system does not consider the actual run-time current noisy acoustic environment in which the audio was captured in order to set the threshold. The resulting imprecise setting of the thresholds may result in noticeably inaccurate results where true speakers are not provided access to things locked by speaker verification while imposters are permitted access. Since speaker verification is considered a fundamental function of many computing locked devices, this is becoming increasingly important.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of an example setting for providing speaker recognition according to at least some of the implementations described herein;

FIG. 2 is a schematic diagram of an example system for providing speaker recognition with context aware confidence modeling according to at least some of the implementations described herein;

FIG. 6 is a detailed flow chart of an example process for providing speaker recognition using context aware confidence modeling and directed to the generation of a context database;

FIG. 8 is a schematic diagram of a context database according to at least some of the implementations described herein;

FIG. 9A is a graph for quantifying FA and FR rates to perform the FA and FR error rate estimation model as described herein;

DETAILED DESCRIPTION

Figure 3:
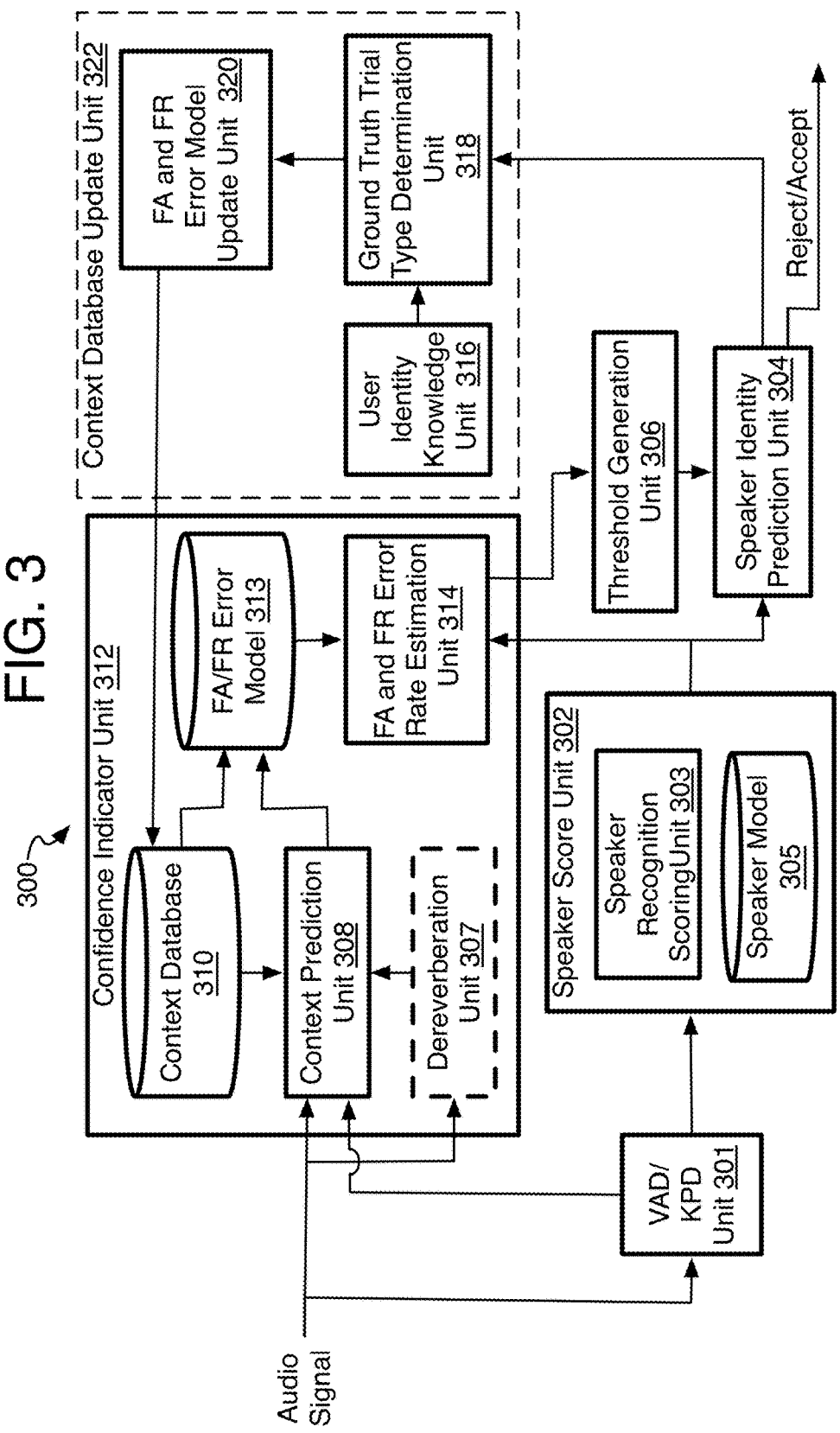
FIG. 3 is a schematic diagram of another example system for providing speaker recognition with context aware confidence modeling according to at least some of the implementations described herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, tablets, computers, automobile audio phone systems, building or room security or environment control systems, internet of things systems, etc., may implement the techniques and/or arrangements described herein. Further, while the following description may set forth numerous specific details such as logic implementations, types and interrelationships of system components, logic partitioning/ integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, anon-transitory article, such as anon-transitory machine or computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Methods, devices, apparatus, computing platforms, and articles are described herein related to speaker recognition using context aware confidence modeling.

Speaker recognition (SR) may provide for speaker acceptance or rejection (e.g., in the case of device access or security), speaker identification, or the like. For example, speaker recognition (SR) techniques may provide for new modalities for device login and/or for application specific uses based on recognized users. An SR system or speaker verification (SV) system that performs these functions typically produces a score for the likelihood that an utterance of speech is from a particular speaker. The higher the score, the more likely there is a match between the run-time speech sample of the particular speaker and the speaker model trained with enrollment speech samples. The decision whether to accept or reject the speaker is determined by comparing the speaker score to a pre-determined threshold. The threshold may provide or quantify a minimum similarity amount for positive recognition of a speaker and depend, at least in part, on the values of the false accept rate and false reject rate. Thus, the threshold may vary depending on the purpose of the application using the recognition decision, or different reasons that a program is using the verification when it has multiple threshold levels. The thresholds are typically determined by empirical methods, and generally are set depending on the criticality of the verification where the more important the verification, the higher the threshold value. For example, security programs are generally set at higher thresholds than non-security thresholds. Thus, an SR threshold to unlock a smartphone may be higher than a threshold used to identify a speaker to personalize media content consumption. Finding the optimal threshold will minimize the two possible errors of false accept and false reject. Choosing the optimal threshold is very difficult, however, especially in noisy conditions so that a SV system should be able to handle varying optimal thresholds.

It has been determined that such noisy conditions can be caused by signal quality factors such as signal (or speech)-to-noise ratio (SNR), other classifiable noise types, and/or reverberation can greatly influence the distribution of true (or target) speaker and impostor score distributions. The conventional SR scores that do not incorporate compensation for current signal quality factors affecting a current audio signal are generic so that an accurate estimate of error rate is not possible. Thus, applications that solely use the conventional SR score to compare to a conventional empirical threshold to decide on speaker identity are under-informed as SR score only indicates how much the utterance matches to the enrolled model rather than real conditions.

Some progress has been made with methods that use reliability and/or confidence modeling for SR applications. These methodologies, however, typically form a single confidence value for a recognition decision session of using probability functions with score distributions, and some resolve these issues by using more robust sampling techniques. These confidence values, however, do not improve accuracy in modeling the current noisy conditions (or run-time acoustic environment) in which an audio being verified is captured, nor can these confidence values adapt to changing noisy conditions.

To resolve the issues mentioned above, it has been discovered that the noisy conditions can be reflected in accurate error estimations in the form of false accept and/or false reject rates for example, and these error estimates then can be used as confidence values to refine the thresholds for comparison to a score. Particularly, the distributions of target and impostor scores in a SR system varies greatly with SNR, noise type, reverberation and other factors. By incorporating at least some of these factors, confidence indicators can be generated that more accurately reflects the true distribution of projected error rates. Thus, the disclosed method and system uses confidence modeling that generates confidence indicators in the form of false accept (FA) and false reject (FR) error probabilities that provides more precise information to a host application to set a threshold for comparison to a current score distribution. Many host applications set the threshold based, at least in part, on the value of the FA and FR rates. For example, speaker recognition for user authentication to access an electronic device may have a target false accept rate that is lower than a speaker recognition application that will allow the speaker to open a file on the device, which in turn may have a target false accept rate that is lower than a speaker recognition application that will allow a user to play music on the device.

These techniques may include generating a context database (also referred to herein as a trial database). The context database includes context score distributions indexed by context and having associated data with each context entry. For example, the context database may include a development corpus for different combinations of noise types and/or SNRs, where each combination or context includes audio signal data that forms the context, a context score distribution, and a context index value or code to list the context by the type of noise and/or SNR level. Each context also may have context parameters that characterize the context score distribution. The context parameters may be determined by using fitted Gaussian curves by one example and as explained in detail below. Once the speaker recognition process is running, the input audio signal is compared to the pre-stored audio signal data of the different contexts in the context database until a closest match is found. By an alternative form, a context model may be generated and the system may compute a likelihood of different context models to determine a matched context. Once the matched context is determined, the context parameters representing the context score distribution of the matched context are then obtained and placed in the confidence model with a current speaker score of the captured audio to compute a more precise false reject and/or false accept rates as the confidence values. By one example form, the confidence model is based, at least in part, on a cumulative density function (CDF). The false accept and false reject rates are then provided to a host application to determine a threshold for comparison to the current speaker score.

Also, such confidence modeling may use an adaptive methodology as well that can continue learning and fine-tuning the error (or confidence) models for enhanced performance in time. Once a decision (or trial) is complete, a secondary recognition operation is performed and the verification of a true (target) speaker or imposter is tested to determine the ground truth of the decision. When the truth can be determined, the decision (accept or reject) as well as the identification of the context and the speaker score used is saved. When some criteria is met, such as a sufficient number of repeating trials with the same or sufficiently similar results, the associated context may be updated by adding the new speaker scores to the speaker score distribution of the context. Otherwise, new contexts may be added to the context database, while outdated and/or unused contexts may be removed from the context database. The updated context database then may be used to update a FA and FR model that computes and stores the context parameters of each saved context score distribution thereby providing a continuous learning model for estimating FA and FR error rates in multiple contexts. As mentioned above, the context parameters can then be used to compute highly accurate FAs and FRs as confidence values. The details are described below.

Referring to FIG. 1, an example setting 100 provides speaker recognition arranged in accordance with at least some implementations of the present disclosure. Setting 100 may include a user 101 providing audio input 111 to a device 102. Although illustrated with respect to a single user 101, as discussed further herein, in some examples, one or more of multiple users may provide audio input 111 to device 102. As shown, in some examples, speaker recognition may be implemented via device 102 such that device 102 may be a smartphone. However, device 102 may be any suitable device such as a computer, a smart speaker, a robot, a personal speech assistant, a laptop, an ultrabook, a smartphone, a tablet, a phablet, a wearable device such as a smart watch or wrist band, eye glasses, head phones, a security device whether a separate device, a conferencing device, a cloud based computing device, or the like. This may include devices that provide user access to computer programs and/or are part of larger systems to unlock or lock physical devices such as a building or room security system, and so forth. In any case, device 102 may be described as a computing device as used herein.

Device 102 may provide any suitable speaker recognition system based on audio input 111. For example, device 102 may include or operate a speaker recognition application. The techniques discussed herein may be provided by hardware, firmware, software, or a combination thereof and may be accessed or implemented via an application program interface or the like. In an implementation, user 101 may be attempting to login to or unlock device 102 via speaker recognition. If user 101 provides audio input 111 that is identified as corresponding to an allowed user, device 102 may allow access to and, if not, device 102 may remain locked. In another implementation, user 101 may be attempting to provide audio input 111 such that device 102 may perform a function based on audio input 111. In such cases, if audio input 111 is identified as corresponding to an allowed user, device 102 may perform the function. In another implementation, device 102 may attempt to identify which user of multiple users corresponds to audio input 111. For example, depending on which of multiple users audio input 111 corresponds to, an application may enable particular speech recognition user settings or the like. For example, in such cases, multiple users may have pretrained corresponding acoustic models for speech recognition and, based on audio input 111, a speech recognition application may apply the acoustic model corresponding to user 101 for speech recognition. Such examples may be particularly useful in meeting settings such that speech recognition may be performed based on the recognized user to improve accuracy.

In any event, audio input 111 may include speech and noise corresponding to setting 100. The speech may include any suitable speech, utterance, sound, or the like. The noise similarly may include any suitable background noise or the like such as car noise, outside noise, babble (cafeteria) noise, side noise, white noise, music noise, second speaker noise, side music noise, side second speaker noise, clean or no noise, or the like. Noise may include reverberation effects and artifacts introduced by the capture device (microphone), and the noise may include intrinsic properties in the captured speech (such as those that change depending on the health and mood of the user) that causes the speech to deviate from the normal state of the user are considered a part of the context and referred to as noise as well. The speaker recognition techniques discussed herein may provide, via device 102, prediction of the type of noise corresponding to audio input 111 (e.g., in the acoustic environment of setting 100) and by using an adaptively updated context database, estimation of the current speech-to-noise ratio corresponding to the audio input 111, and determination of a confidence value including a false accept rate, false reject rate or both in real time (or close to real time) based on at least the type of noise and the speech-to-noise ratio.

Referring to FIG. 2, an example system 200 for providing speaker recognition is arranged in accordance with at least some implementations of the present disclosure. The system 200 may include or be an application performing speaker recognition or speaker identification, and may include any suitable application such as a device login application, a biometric security application, system login applications, an authenticated command application, secured voice based command and control applications, personal assistant applications, perceptual computing applications, or the like. Furthermore, speaker recognition may be performed based on the received audio based on a single speaker comparison (e.g., to determine whether the received audio is associated with a particular identity) or based on a multi-speaker comparison (e.g., to determine which identity the received audio is associated with). Such techniques are discussed further herein. The discussed techniques may provide for predicting noise characteristics of an acoustic environment (e.g., based on a noise type label and/or a speech-to-noise ratio) to determine confidence values.

System 200 may include a microphone or microphone array 201 to receive audio input (AI) 111 from a speaker 101 (or multiple users or an environment or the like). A microphone array can feature a beamformer to reduce background noise and dereverberation to mitigate room reverberation. The system 200 may have a speaker recognition scoring module 202 that uses at least one speaker model 205, a confidence indicator unit 204, a threshold unit 208, and a speaker recognition module 210. The confidence indicator unit 204 may have a context unit 206, a context database 207, an error and confidence model unit 209, and an updating unit 220.

In some examples, audio input 111 is issued by user 101 to login to system 200 and/or to have system 200 perform an operation. Microphone 201 may receive any audio input including background noise or even silence. For example, audio input 111 may include any speech issued by user 101 and any other background noise or silence or the like in the acoustic environment of microphone 201. Audio input 111 may be characterized as audio, input audio, input speech, an utterance, or the like. Microphone 201 may receive audio input 111 (e.g., as sound waves in the air) and convert audio input 111 to an electrical signal such as a digital signal to generate audio data (AD) 211. This may include any analog to digital conversion and/or sufficient pre-processing of the signal that may be required for speaker recognition analysis. Audio data 211 may be stored in memory (not shown in FIG. 2), transferred for continued processing, or the like.

Speaker recognition scoring module 202 may receive audio data 211 to generate speaker recognition scores (SRSs) 212. Speaker recognition scoring module 202 may generate speaker recognition score 212 using any suitable technique or techniques. In an implementation, speaker recognition scoring module 202 may extract features from audio data 211 and apply speaker model 205 based on the extracted features to generate speaker recognition score 212. The extracted features may include any suitable features, feature vectors, or the like such as coefficients representing a power spectrum of audio data 211. Furthermore, speaker recognition scoring module 202 may implement any suitable speaker recognition scoring model via speaker model 205. For example, the speaker recognition scoring model may be a Gaussian mixture model (GMM), support vector machine, i-vector probabilistic linear discriminant analysis (PLDA), i-vector cosine distance, a neural network, or the like. Speaker recognition scoring module 202 may apply speaker model 205 such that speaker model 205 may be pretrained based on an enrollment sequence or the like performed by a target user. For example, a user of system 200 may provide speech to system 200 to generate speaker model 205 based on the received audio. In other examples, multiple users may generate multiple speaker models 205, which may be applied by speaker recognition scoring module 202 to provide multiple speaker recognition scores 212, one for each speaker.

Speaker recognition score 212 may include any suitable data or data structure indicating a speaker recognition score. For example, speaker recognition score 212 includes a value or score representative of the similarity between audio input 111 received from user 101 and a modeled audio input corresponding to a target or true user. For example, a higher value or score may indicate a greater similarity between audio input 111 received from user 101 and a modeled audio input corresponding to a target user. As used herein, the term target or true user may include any user corresponding to a pretrained speaker model. Furthermore, received audio may be associated with an unknown user, a user being tested, or the like.

Speaker recognition scoring module 202 may provide a speaker recognition score (SRS) 212 to speaker recognition module 210 and to the confidence indicator unit 204. The confidence indicator unit 204 is described in detail on system 300, but can be summarized here to perform context predictions for the audio input by a context unit 206 that compares the data of the audio input 111 with audio signal data of a context also having a pre-stored context score distribution and that may be stored in a context database 207 indexed by context. The comparison may be based, at least in part, on machine learning models that are used to determine at least a context or noise type (or label) and a SNR level (or value) of the signal data of the audio input. At least the noise type and SNR are used to determine a matching context.

Once the context is determined, the score distribution of the matched context may be used by the error and confidence model unit 209, and specifically by an error model (or FA and FR error model), to generate context parameters of the score distribution. The context parameters are then provided to form a confidence model (or FA and FR error rate estimation model). The confidence model uses the context parameters and the SRS 212 of the current audio input to compute confidence indicators, here in the form of false accept rates or false reject rates or both. A cumulative density function may be used for this purpose, and the details are also described below. The confidence indicators (CIs) 218 may be provided to a threshold unit 208.

The threshold unit 208 may generate a threshold 214 based on the confidence indicator(s). By one form, the thresholds are determined empirically, wherein different CI values, or specifically FA and/or FR rate values, indicate a certain threshold level as described in detail elsewhere herein. This may be performed by a host application that uses the speaker recognition. By other forms, an adaptive threshold is provided that is based at least in part on an identified acoustic environment context as well. See, U.S. patent application Ser. No. 15/083,548, filed Mar. 29, 2016, and which is incorporated herein in its entirety for all purposes. These may be performed using any suitable technique or techniques.

Once the threshold is set, a speaker recognition module 210 may associate audio input 111 with a particular target user if the speaker recognition score for any target user is more than a threshold. If no user has a speaker recognition score more than the threshold 214, speaker recognition module 210 may provide a reject signal 216. If multiple target users have speaker recognition scores more than a threshold, speaker recognition module 210 may provide a target user corresponding to a largest of the passing speaker recognition scores or all passing target users. Thus, speaker recognition module 210 may accept (e.g., provide an accept signal) user 101 as corresponding to a target (or true) user, or speaker recognition module 210 may reject (e.g., provide a reject signal) user 101 as corresponding to the target (or true) user. As noted, the decision is then provided to the confidence indicator unit 204 for potential updating of the context database.

Also, the context database 206 may be adaptive or updated by updating context distribution data when a recognition decision has been made. When the ground truth of such a decision is determined, the score of that decision (accept or reject) can be added to the data of the pre-stored context score distribution, and updated context parameters may be computed for that pre-stored context. Otherwise, when a new context distribution is detected, the new context may be added to the context database 207 to adaptively update the context database as well. Older or otherwise unused score distributions for particular contexts may be dropped form the context database as explained below.

While FIG. 2 illustrates an example speaker recognition pipeline for an accept/reject determination for speaker verification, the techniques and systems discussed herein may be implemented via any speaker recognition pipeline or architecture such as open set or closed set speaker identification, phrase dependent or phrase independent speaker identification, or the like.

Referring to FIG. 3, an example speaker recognition (SR) system 300 is arranged in accordance with at least some implementations of the present disclosure. The SR system 300 may be considered a stand-alone system or may be part of a host application, and may perform speaker recognition for a variety of purposes also as already described above with system 200. The SR system 300 may include a speaker score unit 302 that receives classified audio input (or signals) from a voice activity detection and/or key phrase detection unit 301 that classifies the audio input into voice versus noise as described below. The speaker score unit 302 then determines a speaker recognition score which is then provided to a speaker identity prediction unit 304 that compares the score to a threshold obtained from a threshold generation unit 306 to provide a recognition decision of either reject, where the speaker is found to be an imposter, or accept where the speaker is found to be the target or true speaker.

The SR system 300 also has a confidence indicator unit 312, similar to confidence indicator unit 204. The confidence indicator unit 312 has a context prediction unit 308 to receive data of the audio input (such as the digitized audio signal) to predict the context of the audio input. The confidence indicator unit 312 also receives the current speaker score from the speaker score unit 302 and that corresponds to the audio input data provided for context prediction. The confidence indicator 312 determines a confidence value by using the current speaker score and the context parameters of the score distribution of the context matched to the audio input data. The context parameters and current speaker score are provided to a confidence model described in detail below.

The SR system 300 optionally also may have a context database update (or statistics) unit 322, similar to updating unit 220 (FIG. 2). The update unit 322 receives the speaker identity decision as to whether the speaker was accepted or rejected. The ground truth of the decision may be determined, and the context score distribution used to form the decision can then be updated, or when no such context is already stored in the context database, a new context score distribution may be added to the database. Older, unused context score distributions may be dropped. Thus, the context database provides data for a continuous learning model thereby increasing the accuracy of the confidence model's error estimation.

Now in more detail, and by one form, a sampling of the input audio signal may be provided, such as 25 ms samples that may be consecutive or at intervals, and may be received by the VAD/KPD unit 301. The VAD/KPD unit 301 may or may not be considered a part of the speaker score unit 302. The VAD part of the VAD/KPD unit 301 separates the voice signal from the noise signal, and may provide a segment of voice like a sentence or phrase which then may be used for text-independent SR. The KPD part of the VAD/KPD unit 301 may identify key phrases including full words or short sentences such as "Alexa" or "Hey Cortana" and may include speech (versus speaker) recognition operations, which then may be used use for text-dependent SR. Once the speech is classified, a whole contiguous segment of the speech, such as an utterance and/or sentence (up to some time limit say 5 s) may be provided to the speaker score unit 302.

The speaker score unit 302 may have at least one speaker model 305 that provides a speaker-specific corpus forming speaker model 305, and a speaker recognition scoring unit 303. The scoring unit 303 receives the audio signal, extracts features as explained above, and compares the features to the speaker models of particular speakers that are trained with pre-recorded enrollment speech samples as explained above with speaker model 205 and speaker recognition scoring unit 202. The result is a single speaker score for each speaker, and per speaker verification session. As mentioned, the speaker score is provided to the confidence indictor unit 312, and specifically to an FA and FR error rate estimation unit 314 that operates as the confidence model. The speaker score is also provided to a speaker identity prediction unit 304 that performs the comparison of speaker score to threshold to make a recognition decision.

In parallel to the speaker score generation, the digitized audio input signal may be provided to a context prediction unit 308 that compares pre-stored context audio signal data of pre-stored context data from a context database 310 to the audio input signal to classify the audio input signal as one of the contexts, and this comparison may include the use of a sequence of short samples of the input audio signal, such as 25 ms samples. Otherwise, as mentioned above, while signal to signal (or sample to sample) comparison is one way to find a matched context, signal to model comparison is another way. The modeling here can be achieved using GMM, support vector machine (SVM), neural network, etc., similar to that used by the speaker score modeling. The context database 310 is generated by running many different audio samples of different desired noise types. The SNR levels can be determined, or mapped, for each of these samples as well and as described in detail below. A dereverberation component, or mapping of reverberation components to the noise type, also may be determined as described below. The context database may hold a noise type model database formed of a development corpus for each context including the audio signal data of the noise type and a score distribution for a number of runs with a particular context. A SNR model database also may be part of the context database to hold SNRs detected for certain contexts, as well as a reverberation database that maps reverberations to the noise types. The resulting context database at least has entries indexed by context by symbols or codes described below, and each includes audio signal data that provides the noise type of the context, an associated speaker score distribution that indicates the context, RT60 reverberation levels associated with the noise type when provided, recognition decision results (count of accept and reject) based on specific scores on the score distribution once deployed, and whether in the same database or a separate database, context parameters that represent the score distribution. This explicitly classifies sounds into broad categories. More details of the context database are provided below.

By an alternative approach, another way to establish the context library is to use a cluster approach by having a context database of the background sound. Some features (i-vector, DNN bottleneck representation, and so forth) can be extracted from the background sound and clustered into noise types. Statistics are then built for all the SR scores corresponding to the clusters. In other words, the cluster label can be treated as categorical labels so that each cluster may represent many classes in a single category. During test time (or pretraining), the matching will not classify to labels. Instead, during run time, a distance is computed from the values of the outputs of the last hidden layer of the noise model and to the audio data forming each of the clusters by a distance such as Euclidean or Manhattan (taxicab) distance to determine the closest match by the shortest distance. The advantage of this technique is that it makes no assumption that the categorical classification is the best cluster.

Optionally, the input audio data may be provided to a dereverberation unit 307 that may or may not be considered part of the confidence indicator unit 312 since it can be used for many different audio operations. The dereverberation unit 307 removes or reduces the reverberations as described in greater detail below, and provides the cleaner signal (and/or indication as to which signal portions are reverberations) to the context prediction unit 308.

The prediction context unit 308 compares the incoming audio input signal data to each or some set of the audio data of the contexts in the context database. The comparison may be accomplished by using Gaussian mixture models (GMMs) or by training classifiers for explicit classifying of sound categories that compare an extracted feature vector to the context audio signal data, and by one form, may include the use of a feature space such as Mel-frequency cepstral coefficients (MFCC) filterbank feature or other spectral features can be sued, to name a few examples. By other examples, DNNs, GMMs, SVM, and so forth may be used as well. By one example form, the result is a range of probabilities each associated with a compared context where the context with the highest probability is selected as the matching context. Other variations for selecting the matching context can be used as well.

Once the matching context is determined, the context parameters for the score distribution of the matching context is either computed by an FA/FR error model unit 313, or obtained from this unit or the context database if the context parameters are pre-stored. The context parameters may be determined by fitting Gaussian curves to the score distributions of the indexed contexts, and the context parameters may be the mean and variance of the fit curves. Such context parameters can be provided for both an imposter score distribution and a target score distribution. This is explained in detail below. Once the context parameters are determined or obtained, the context parameters are provided to the FA and FR error rate estimation unit 314.

The FA and FR error rate estimation unit 314 uses the speaker score and the context parameters in a confidence model to generate the confidence values, or the FA and FR rates. By one form, a cumulative density function (CDF) is used to compute the FA and FR rate values. The FA and FR rates are then provided to the threshold generation unit 306 operated by the SR recognition system, a host application, or other application. As mentioned, the thresholds may be set differently depending on the FA and FR rates and the criticality of the speaker verification. Thereby, the setting of the thresholds effectively factors the current context or acoustic environment in which the audio is captured significantly increasing the accuracy of the SR system.

Once the thresholds are determined, the speaker identity prediction unit 304 then compares the threshold to the current speaker score to make a recognition decision. By one form, when the speaker score is lower than the threshold, the speaker is rejected, but when the speaker score is higher than the threshold, the speaker is the true speaker.

As to the updating of the context database, the recognition decision, or trial result may be provided to a ground truth trial type determination unit 318 of the context database update unit 322 to determine the ground truth of the decision. This unit 318 provides confirmation that the decision was correct. This may be performed by using a user knowledge identity unit 316 that provides identification by asking the speaker questions or by obtaining secondary identification data of the user whether by biological information, such as finger prints, facial recognition, full or partial body person recognition, or retinal scan, or by other methods. The user knowledge identity unit 316 may be, or may have, a user database that pre-stores relevant identification data that can be used to perform the secondary identification during run-time.

When the ground truth confirms the trial decision (accept or reject), an FA and FR error mode update unit 320 may store the update data to be used to update the context database when sufficient data has been collected to update the context database. The stored data may include the identification of the context used as well as the context parameters, score distribution, and trial entry (accept or reject) for the context. After a predetermined point, such as a certain number of repeating confirmations of the context, updating of the corresponding pre-stored contexts in the context database may be updated, such as by adding new scores to the score distribution of the context. Otherwise, sufficient data may be collected and aggregated to form a new context not already in the context database when a resulting score distribution is sufficiently different from any of the other stored contexts. When the clustering approach is being used, a new cluster may emerge that was not previously captured (or identified) by training data. Either way, once the context score distributions are updated in the context database, new context parameters may be computed by the FA/FR error model unit 313 either before run-time to pre-store the context parameters, whether in the context database or other memory, or may be computed during run-time as needed. The updating of the context database may occur offline, and by one form periodically offline, rather than during run-time. It will be understood that a reject decision indicates an imposter score distribution rather than a target score distribution.

It should be noted that the term context here may refer to an acoustic environment and all of the factors that affect that environment. Thus, a noise type, the SNR, and reverberation time are some of the components that form a context. A defined context, however, may be defined by only one such component so that a context may be indexed in the context database only by that one component. Thus, a context may be indexed by noise type or SNR or reverberation time alone for example.

Figure 4:
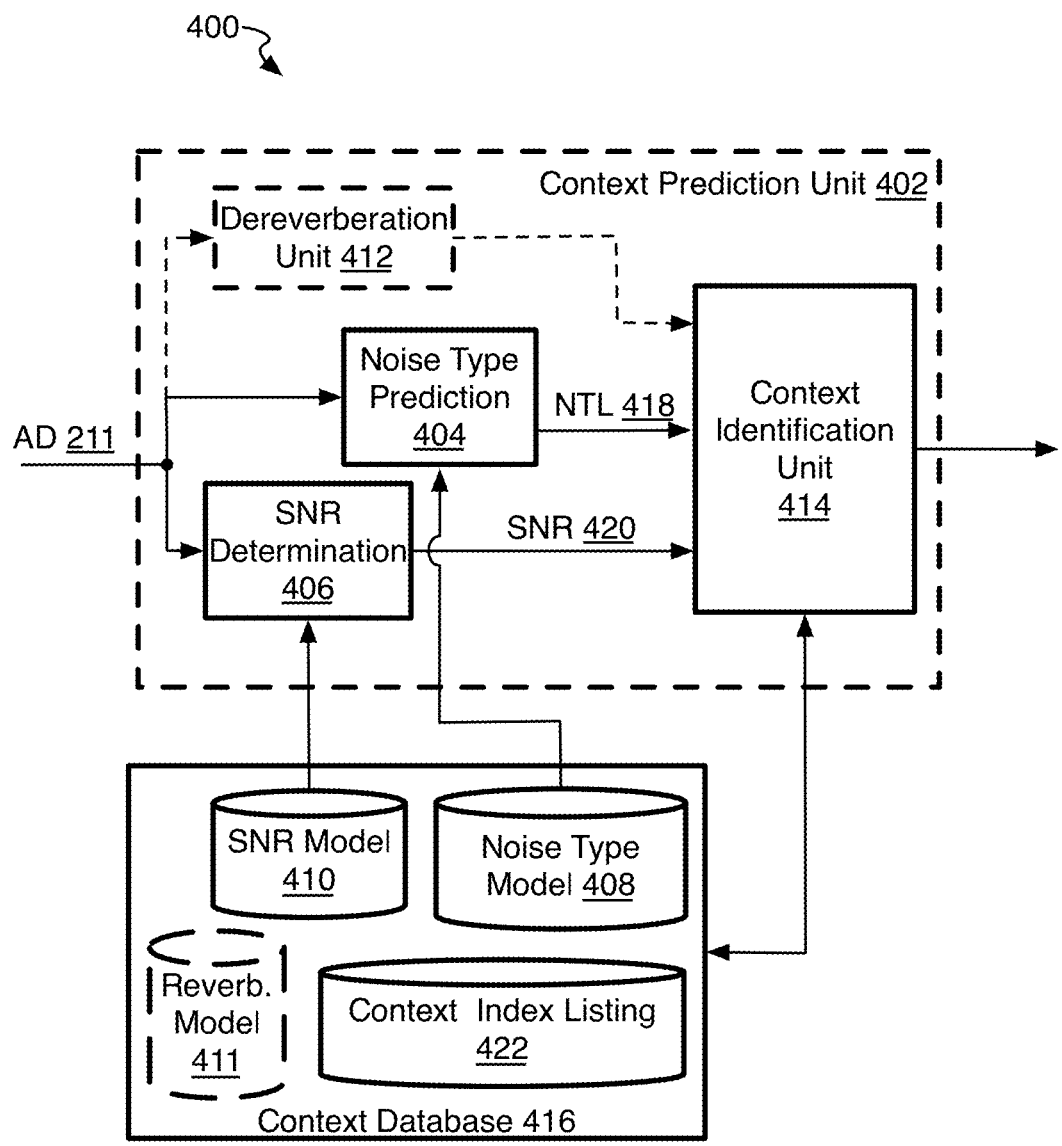
FIG. 4 is a schematic diagram of an example speaker recognition system with a context prediction unit to perform speaker recognition with context aware confidence modeling according to at least some of the implementations described herein.

Referring to FIG. 4, an SR system 400 may have a context prediction unit 402, similar or the same as prediction unit 308, to establish the context database and that may have a noise type prediction module 404, a speech-to-noise (SNR) determination module 406, a pretrained noise type model 408, a pretrained speech-to-noise (SNR) model 410, and optionally a pretrained reverberation model (or reverberation time (RT)) model 411. The noise type model 408, SNR model 410, and reverberation model 411 may be considered part of a context database 416 along with context index listing database 422, similar to context database 310, held in a memory. The SR system 400 also may have a context identification unit 414.

To first establish the context database 416, a number of training (or pretraining) or learning trials are performed to provide samples of audio signals or data of noise recordings for each specific desired noise type. By one form, the learning trials include the capture of acoustic waves in a controlled environment with intentionally set and known levels or contexts. This may be performed offline and before deployment. By one form, this may include obtaining noise samples that are separate from obtained clean speech samples. By other examples, the two are received in the same mixed audio signal. More specifically, the learning trials may be in a variety of noise conditions. The noise types may be any internal or external factor that an SR system can classify and that may create or influence the acoustic environment in which acoustic waves are created and captured, and that affect the audio data. This may include outside traffic noise, interior automobile noise, other outside noise, babble (cafeteria) noise, side noise, white noise, etc. These are factors that may affect the performance of the SR system in terms of the accuracy of the predictions made to perform the speaker recognition.

The recorded noise type audio signals are used to train a noise type model so that the model outputs a probability that an input audio signal (or data) is a certain noise type (and in turn, context as explained below). To train the noise type model (or model unit) 408 to predict noise type, a feature space such as MFCC or other spectral features may be used to build a model (or part of the model 408) for each noise type, where each noise type is associated with a noise type label 411. Noise type model 408 may be any suitable model such as a machine learning model, a Gaussian Mixture Model, SVM, DNN, any other sufficient trained classifier that learns boundaries between the noise classes, or the like. For example, noise type model 408 may be pretrained based on the noise types sampled and recorded as mentioned above, and may include a large dataset of instances of different noise classes such that a mixture model, or other type of model, may be fit over each class of noise. The pretrained mixture model or the like of each noise type may be stored as part of the noise type model 408. For the clustering approach, the outputs of the last hidden layer of the noise type model each may be used as a representation of the noise type and as an input for clustering. Alternatively, i-vectors can be used as a feature for clustering. The sampled noise types are set as noise classes and may include any suitable noise class such as those expected to be in setting 100 during an utterance by user 101 (please refer to FIG. 1), and are sampled as mentioned above. For example, the noise classes may include an outside traffic or car noise class, an outside noise class, a babble (cafeteria) noise class, a side noise class, a white noise class, a music noise class, a second speaker noise class, a side music noise class, a side second speaker noise class, a clean or no noise class, or the like. The model then may include an audio signal or audio signal data for each noise type class (and sub-classes when present).

A training run is then performed to generate a speaker score distribution for each noise type. Thus, context samples are now received with combined speech and noise as the audio samples, and the noise classification model is applied to identify the noise type. Meanwhile, a speaker or context score is generated, and each time a sample has the same noise type, the speaker score of that sample is added to the context score distribution. During the training of context database, it is desirable to capture all the possible expected operating environments of the end-product. So for example, for a product intended to work inside a car, noises generated from car engine, wind, road, or outside traffic are trained. The context score distribution is then stored in the context index listing database 422. Alternatively, a category representation may be stored for individual clusters for the clustering method. It will be understood that both an imposter score distribution and target score distribution may be generated for each noise type (or context).

During implementation, noise type prediction module 404 may implement noise type model 408 based on audio data 211 to generate a noise type label 411 that indicates the noise type of the input audio. Specifically, based on audio data 211 (e.g., a novel received noise clip), noise type prediction module 404 may provide a probability (or context score) for each sample of audio data 211 based on comparison of the audio data 211 to the noise type models or audio data of model 408 and for each or individual implemented noise classes. By one form, this may involve extracting a feature vector for each unit (or sample) of the captured audio (which may be generally around 25 msec worth of data). Then a feature space may be used such as Mel-frequency cepstral coefficients (MFCC) to determine probabilities for each or individual noise types. Thus, by one example, the noise type prediction module 404 may predict a matching noise class based on a highest probability from among the probabilities (or likelihood scores) for each implemented noise class. For example, noise type label 411 may be a noise label corresponding to the highest probability (or likelihood score). For example, if five noise classes are implemented, five probabilities may be generated (e.g., one for each noise class) and noise type label 411 may be the label corresponding to the noise class having the highest probability (or likelihood score). When multiple classes (or sub-classes) are present, a model may be established for each sub-class category as well. For the clustering approach, the Euclidean, Manhattan, or other distance is determined between the selected noise type label and the center, edge, or other part of the category clusters, and the distance is used to select the best cluster (such as the shortest distance). Noise type label 411 may include any suitable data or data structure representing a noise class such as a label (e.g., "no noise" (clean), "babble", automobile, etc.) or a value mapped to such a label or the like. As mentioned, each noise type or noise type class may be considered a context, but that the contexts very well may include other factors such as SNR as described below.

As to SNR, speech-to-noise determination module 406 also may receive audio data 211 and speech-to-noise determination module 406 may generate a speech-to-noise ratio (SNR) 420 based on audio data 211. Speech-to-noise determination module 406 may generate speech-to-noise ratio 420 using any suitable technique or techniques. For example, speech-to-noise determination module 406 may classify audio data 211 (e.g., an audio segment) as speech versus noise by applying and generate speech-to-noise ratio 420 as a ratio of the power of the speech portion to the power of the noise portion of audio data 211. This may be performed by applying a pretrained speech-to-noise ratio (SNR) model 410.

In order to generate the SNR model 410, the SNR model 410 receives both speech samples that are separate from received noise samples, and combines the two samples. The model is trained to identify which parts of the combined sample are speech, and which part is noise. During implementation thereafter, the two parts identified by the model can be used to determine the SNR of an input audio sample. The model is generated by using automatic speech recognition (ASR) models or networks where the ASR typically has phoneme recognition as part of the pipeline. Forced-alignment then may be used to determine the endpoints of each phoneme. Thus, speech parts can be very accurately extracted where noise remains. Also one can train a classifier, such as a DNN to determine speech vs nonspeech for each frame. In these implementations, a large development corpus may be generated for each noise class, and may be used such that the corpus includes multiple speakers (e.g., including large number of speakers such as 40 or more with many different voices) sampled, each sampled separately, from a diverse population (e.g., diverse in terms of gender, ethnicity, language, age, etc.), but also may include emotional state (where anger may change voice inflections by one example), health state (including coughing, sneezing, raspy voice, and so forth), or any other factor that could affect the prediction accuracy. This forms multiple training and test utterances with many different combinations of speech and noise. By one example, the development corpus may be recorded in a clean lab environment with high quality microphones with minimal ambient noise and reverberations in ideal conditions. Thereafter, different conditions can be simulated artificially by adding noise and convolving room reverberation to the clean data as desired. The model 410 then may be stored, whether or not considered part of the context database 416.

Once the SNR model is formed, the SNR determination unit 406 may use a voice activity detection (VAD) and key phrase detection, such as that with the VAD/KPD unit 307 (FIG. 3) mentioned above, where individual input sound sequences in an audio sample is categorized as either voice (signal) energy or non-voice (noise) energy by VAD and determined by applying the SNR model 410. By one example, some baseline distribution parameters may be set for an SNR level. Then these parameters can be fit using regression with SNR. Alternatively, parameters can be generated at all of the possible SNR values (e.g., −20 to +20 dB in 5 dB increments) during the training stage. Then a simple table lookup may be generated during training and used during run-time. Many variations are possible. The result is a ratio between signal (speech) and noise energy that gives a SNR estimation over a session or number of audio sequences to form a single SNR value 420 for the trial. This may be formed by some sort of probabilistic averaging or other combination of multiple SNRs obtained for each sample of the same audio sequence (or session by a speaker). Another way to say this is to state that based on audio data 211, speech-to-noise determination module 406 may SNR score audio data 211 based on speech-to-noise ratio model 410 to generate speech-to-noise ratio 420. Although illustrated with respect to speech-to-noise determination module 406 implementing speech-to-noise ratio model 410, speech-to-noise ratio 420 may be generated based on audio data 211 using any suitable technique or techniques such as energy threshold techniques or the like.

Both the SNR and noise type label then may be provided to the context identification unit 414. The noise recordings then may be mixed with speech recordings at a good range of speech-to-noise (SNR) values. For each noise scenario or context (e.g., combination of noise type label and speech-to-noise value), a context index value or symbol (or word) may be generated and placed in the context index listing database 422. Thus, one context may be automobile (audio from the interior of an automobile) where each context has an index number or other symbol, at a certain SNR value shown by decibel (dB) level, by one example. For each context determined and tested, the context database unit records the audio data signal, the score distribution of the samples for the particular context, as well as the SNR level. So while the context index listing database 422 may hold the noise type labels (NTLs) and SNR levels, the model data related to the noise type may be stored in a noise type model database 408, while the SNR model data may be stored in an SNR model database 410 and indexed by class for example. The noise may be indexed by sub-classes when multiple classes are present.

Referring to FIG. 8, one possible configuration of an entry line of the context index listing database 422 is in the context database 850 shown where entries may include target or imposter to indicate which the particular context score distribution is directed 852, the context index values including the noise label(s) 854 and SNR level 856 (and reverberation time when used), score distribution values 858, context-related audio signal data 860 that is used to compare to audio input data to determine the context of the audio input, and context parameters 862 when pre-stored on the context database. Note that the context-related audio signal data 860 may not be needed when a model or other data is used instead of a signal-to-signal comparison. This data still may be needed in clustering approaches when the comparison is still performed to form an input to the cluster distance determinations. The same context may have multiple line entries, one for target and one for imposter. For the clustering approach, the context label is the cluster centroid label (or coordinates) in some feature space. Details are provided below with the explanation of the processes 600 and 900.

By one alternative approach, the context prediction unit 402 also may include a dereverberation unit 412 that uses weighted prediction error (WPE) algorithms, minimum variance distortionless response (MVDR) beamformer algorithms, or both, or other algorithms, to remove or reduce the reverberations in the audio data typically defined as impulse responses (IRs) and performed in the frequency domain obtained by Fourier transform. These algorithms can be used to generate a reverberation measurement, which may be in the form RT60, for certain reverberation conditions. Thus, these reverberation measurements, associated with certain acoustic environment contexts, could be another factor to be used to classify the noise type of the audio input. When certain reverberation levels exist, this may be more likely to represent certain contexts (such as an enclosed room). Reverberation time estimation is possible and can be done blindly by analyzing the decay rates of the energy envelope of the observed reverberation speech signal. See for example, http://ieeexplore.ieee.org/document/4517613 and/or https://ai2-s2pdfs.s3.amazonaws.com/4f52-/14f4d29aad063a84cd8a51ac1688dd104b21.pdf.

As shown in FIG. 4, context identification unit 414 may receive noise type label 411 and speech-to-noise ratio 420, and optionally a reverberation time as well. By one form, if only one context listing exists in a determined noise class of the context, that context is selected regardless of the SNR level and reverberation time if provided. By another form, when multiple contexts are available in a single class except each with different SNR levels, the context is selected by first determining the noise type label, and as a sub-class, then selecting the context with the closest SNR to that of SNR 420 and within that noise class of noise type label 411. By another example, default settings for the context parameters (such as the mean and standard deviation mentioned herein) for each of the noise types each may be given a certain SNR and RT60 level. These parameters can change as a function of both SNR and RT60. The mapping between the default context parameter settings to the SNR- or RT60-specific context parameter settings may be a regression (linear, lasso, or DNN, and so forth). Another way is simply to use these three factors in an index of the parameters in a look-up table when sufficient training data is available. For the clustering approach, the ordering may remain the same where the output to the model is the input to the clustering distance computations. Otherwise, any ordering of the context factors could be valid, depending on the available data used to train context models. In other words, if there is a sufficient amount of data to create combinations of three context factors at three levels, 27 different context models can be available to choose from. The ordering of the context factors may be decided by looking at accuracies of context prediction models and selecting the most accurate ones to be used in the categorization first. Other details of context prediction and a development corpus can be found in U.S. patent application Ser. No. 15/083,548, filed Mar. 29, 2016, which is incorporated herein in its entirety, for all purposes.

The resulting output of the context identification unit 414 may be the index code for the matched context. This is then provided to the FA/FR error model unit 313 to either retrieve the associated context score distribution from the context database to use the FA/FR error model unit 313 to compute the context parameters, or to retrieve pre-stored context parameters associated with the matched context and that were previously computed by the FA/FR error model unit 313 during the construction of the context database before deployment. By one form, this includes fitting Gaussian curves on the target and imposter score distributions, and determining context parameters including the mean and standard deviation of each context (or context class or score distribution). The current speaker score and context parameters then may be provided to the FA and FR error rate estimation unit 314 to calculate the context aware confidence values in the form of the FA and FR rates as described in detail herein.

The context database 416 also may be updated adaptively by the update unit 420, and this is described in detail below with process 1000.

Figure 5:
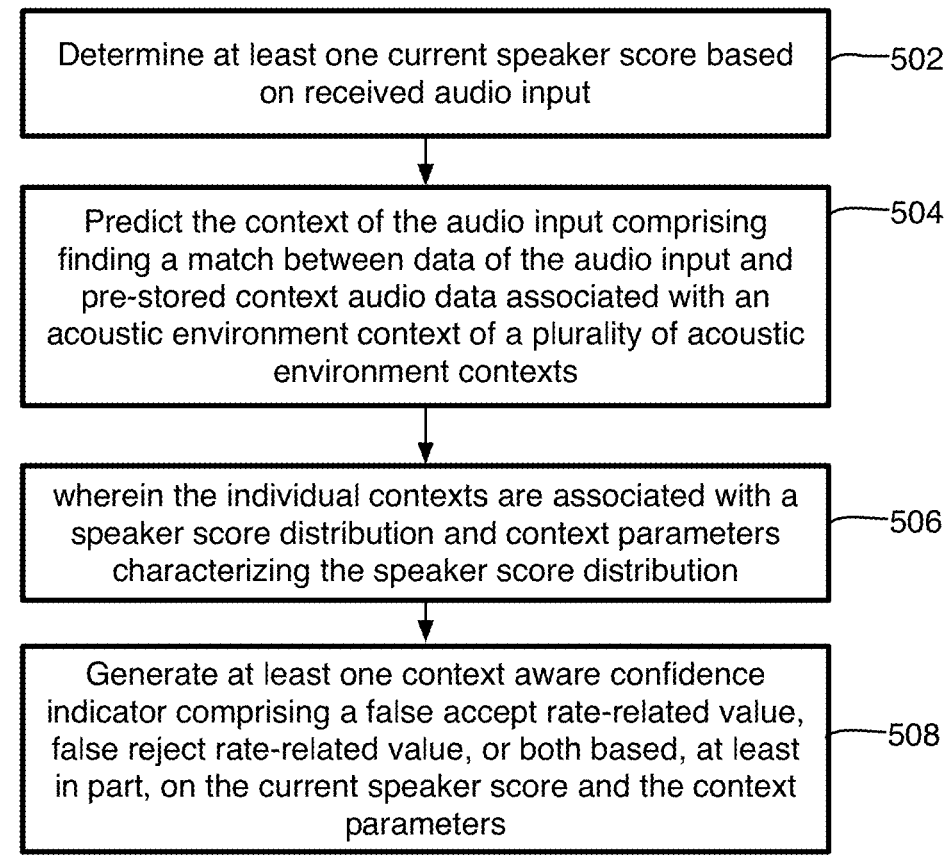
FIG. 5 is a flow chart of an example process for providing speaker recognition using context aware confidence modeling.

Referring to FIG. 5, an example process 500 of method of speaker recognition using context aware confidence modeling, arranged in accordance with at least some implementations of the present disclosure. Process 500 may include one or more operations 502-508 generally numbered evenly, and as illustrated in FIG. 5. Process 500 or portions thereof may be performed by a device or system (e.g., system 101, 200, 300, 400, or any other device or system discussed herein) to provide speaker recognition. Process 500 or portions thereof may be repeated for any amount or instances of received audio, for any number of target users, or the like.

Process 500 may include "determine at least one current speaker score based on received audio input" 502. This may include receiving sufficiently pre-processed audio data that uses speaker scoring with a speaker model generated by an enrollment routine as explained herein. The speaker model may be based on many different algorithms. A speaker score may be provided for an audio sequence or verification (or identification) session where the higher the score, the more likely the audio is from the true or target speaker, by one example.

Process 500 may include "predict the context of the audio input comprising finding a match between data of the audio input and pre-stored context audio data associated with an acoustic environment context of a plurality of acoustic environment contexts" 504. This may include establishing a context database before deployment, and such an operation may include generating a development corpus for each or individual contexts, which may be identified by noise type, SNR, and other factors such as a reverberation value. A noise type model may include the context audio signal data (or context audio data) for a certain noise type and a score distribution obtained by performing a number of trial runs with the certain context, and this is performed for each noise type. An SNR model also may have the available SNR levels detected for each context that is available. Then during run-time, the comparison between input audio data and the context audio may be accomplished by using Gaussian mixture models (GMMs) or by training classifiers that compare an extracted feature vector to the context audio data, and by one form, may include the use of a feature space such as Mel-frequency cepstral coefficients (MFCC), to name a few examples. By one example form, the result is a range of probabilities each associated with a compared context where the context with the highest probability is selected as the matching context. By one form, two score distributions may be determined for a single context, one for the target speaker and one for an imposter.

Process 500 may include "wherein the individual contexts are associated with a speaker score distribution and context parameters characterizing the speaker score distribution" 506. Thus, by one form, each or individual score distribution, each representing a context in the context database, may be provided to an FA and FR error model that computes the context parameters for that context score distribution. One set of context parameters may be provided for a target score distribution, and another set of parameters for an imposter score distribution. This may occur during run-time when a context is selected as a matched context, but could occur before run-time (or deployment) where each generated score distribution is provided to the FA and FR error model to compute the context parameters that are then stored in the context database, or at least indexed with the associated context in the context database, for later use during run-time.

By one form, the FA and FR error model performs curve fitting onto the score distributions to determine the mean and standard deviation of the fitted curve (and in turn, the context score distribution(s)). By one example, normal Gaussian curves are used for the curve fitting. The details of this operation are provided below.

Process 500 may include "generate at least one context aware confidence indicator comprising a false accept rate or a false reject rate or both based, at least in part, on the current speaker score and the context parameters" 508. By one example form then, the current speaker score from the audio input and the context parameters from the matching context can be input to a confidence model. By one example, the confidence model (also referred to herein as an FR and FA error rate estimation model) may be a cumulative density function (see equation (1) below). The target context parameters can be used for computing FA rate and the imposter context parameters can be used for computing FR rate. Other algorithms could be used as well. The details are provided below.

In other words, by one approach, with a development corpus for each context, the distributions of target and impostor scores can be computed for several representative conditions (enrollment and/or test noise types and SNRs). Many different noise types can be used as described elsewhere herein. Each of the distributions can be fitted to a probability density function with parameters (e.g., mean and variance) extracted. Gaussian distributions appear to fit the data well as explained below (See FIGS. 7A-7R). Through this analysis, a database can be established with distribution parameters labeled with several contextual descriptions such as noise type and SNR for enrollment and test conditions.

During a verification phase, the test condition SNR can be computed, and background noise type can be classified by a machine learning algorithm by one example. An optimal enrollment model also may be selected based on the current conditions. The score produced by an SR algorithm can then be used to compute the false accept rate (using the imposter score distribution), and the false reject rate (using the target score distribution). The context parameters of the score distribution used in this computation is determined by finding the closest match of the existing context on the context database that was pre-computed during development phase.

Thereafter, the context parameters of imposter and target distributions (that make up FA and FR error models) are adjusted based on update data captured after deployment, essentially making this modeling approach an adaptive one. The ground truth of a decision (accept or reject) may be determined by secondary recognition operations, and when the ground truth is attained, the context just used, decision (indicating whether the context is for imposter or target speaker), and score may be saved. When a certain criteria is met, such as a certain number of repeating trials for the same context, the associated context in the context database may be updated. Otherwise, new contexts can be added, and old contexts can be removed, from the context database as well. Many details are provided below.

Referring to FIG. 6, an example process 600 of method of speaker recognition using context aware confidence modeling, and directed to establishing a context database arranged in accordance with at least some implementations of the present disclosure. Process 600 may include one or more operations 602-612 generally numbered evenly, and as illustrated in FIG. 6. Process 600 or portions thereof may be performed by a device or system (e.g., system 101, 200, 300, 400, 1100, or any other device or system discussed herein) to provide speaker recognition. Process 600 or portions thereof may be repeated for any amount or instances of received audio, for any number of target users, or the like.

Process 600 is directed to generating the development corpus for the noise types, obtaining SNR levels, forming desired combinations of factors to form contexts, and generating the models and index that form the context database. Thus, process 600 may include "obtain audio signal data of speaker and noise" 602, and particularly to use as samples to form noise type models and SNR models. While the speech samples could be combined with noise samples in a test audio signal, by one form, a noise type corpus may be generated separately from a large speech development corpus at first. Specifically, a corpus of speech samples may be generated or received, and may include any suitable corpus of speech samples. For example, the corpus of speech samples may include a large corpus of speech samples corresponding to multiple speakers (e.g., 30-40 or more speakers) from a diverse population in terms of gender, ethnicity, language, etc., but also may include emotional state (where anger may change voice inflections by one example), health state (where coughing sneezing, raspy voice, and so forth may affect audio), or any other factor that could affect the prediction accuracy. Furthermore, the corpus of speech samples may include several training and test utterances. In an implementation, the corpus of speech samples may be recorded in a clean lab environment with high quality microphones such that there is minimal ambient noise.

Separately, by this example, noise samples may be generated or received. The noise samples may include any suitable noise samples. For example, for anticipated noise scenarios or contexts (e.g., whether alone or combinations of speech-to-noise ratios and noise types expected during implementation), noise recordings may be generated or received. For example, a noise recording may be generated for each noise type (e.g., corresponding to noise type labels) and expected speech-to-noise ratios. In one implementation, the noise types may include car noise (whether outside traffic noise or as recorded from a car interior), outside noise, babble (cafeteria) noise, side noise, white noise, music noise, second speaker noise, side music noise, side second speaker noise, clean or no noise, and so forth.

Process 600 may include "generate speech to noise ratio" 604, and as mentioned, by first pretraining an SNR model so that the SNR model will output identification of voice (speech) and noise portions of the audio data. To train the SNR model, the development corpus of speech samples and the noise samples may be combined or mixed to have the model identify which part of the samples is the speech and which part is the noise eventually to able to establish ratios of the two. The SNR model may be any suitable model such as a machine learning model, mixture model, a Gaussian Mixture Model, a Hidden Markov Model, and so forth, or otherwise by energy thresholding, or the like. For example, for each combination of the speech samples and the noise samples, a mixed sample may be generated. This may be performed to provide each noise type with a range of different available SNR levels. The mixed samples may be generated using any suitable technique or techniques, and the mixed samples may be generated in a high quality lab setting.

In order to store the contexts, a number of trial runs are performed with the SNR models. A determination unit applies the SNR model to audio sample recordings or an audio sequence (or trial) to determine the SNR values to be used. By one example, the speech-to-noise ratios of the samples may include 10 dB and 15 dB levels (or scores), although any suitable noise types and speech-to-noise ratios may be used. As mentioned above, a voice activity detection (VAD) operation may be used to determine the SNR level of individual input audio samples of an audio sequence (or trial) by categorizing the sample, or parts of the sample, as either voice or speech (signal) energy or non-voice (noise) energy, and determined by applying the SNR model. A single SNR level (or value or score) for a single audio sequence (or session) may include some sort of probabilistic averaging or other combination of multiple SNRs obtained for each sample of the audio sequence. Although illustrated with respect to a speech-to-noise determination by implementing a speech-to-noise ratio model, a speech-to-noise ratio may be generated based on audio data using any suitable technique or techniques such as energy threshold techniques or the like. As mentioned a range of SNR values can then be provided for storage in the context database for each noise type or class tested.

Also, process 600 may include "generate noise type label" 606, and as mentioned above, by first pretraining a noise type model. This may include using the recorded noise type audio signals to train a noise type model so that the noise type model outputs a probability that an input audio signal (or data) is a certain noise type (and in turn, context as explained below). To train the noise type model (or model unit) to predict noise type, a feature space such as MFCC may be used to build a model (or part of the model 408) for each noise type, where each noise type is associated with a noise type label. Any suitable model may be used such as a machine learning model, mixture model, a Gaussian Mixture Model, an SVM, a DNN, or any other sufficient trained classifier that learns boundaries between the noise classes, or the like. For example, a noise type model may be pretrained based on the noise types sampled and recorded as mentioned above, where each noise type is considered a class (and may have sub-classes). Also as mentioned for the clustering approach, the output of the last hidden layer of the model is then used to compute and form distances to clusters. Otherwise, a mixture model, or other type of model, may be fit over each class of noise and may include a large dataset of instances of different noise classes. Then, the pretrained mixture model or the like of each noise type may be stored as part of the noise type model. The model then may include an audio signal or audio signal data for each noise type class (and sub-classes when present), and that may be saved as part of the context database. Other details of context prediction and a development corpus can be found in U.S. patent application Ser. No. 15/083,548, filed Mar. 29, 2016, which is incorporated herein in its entirety, for all purposes.

Process 600 may include "perform speaker tests to determine score distributions" 608. Once the noise type model is trained, a trial run is then performed to determine speaker score distributions for each noise type. A further large number of audio samples may be received each with a combined noise type and speaker voice, and still before deployment by one example. The noise type model is applied to identify the noise type, while the speaker score is being determined. For each sample, the speaker score is added to the context score distribution for the associated context (or noise type), and each context score distribution may be stored as part of the context database (either as part of the noise type model database 408 for example, or as part of the context index listing database 422 for example).

Process 600 may include "determine context index of context to be stored" 610. Here, this operation may include labeling the current context with the noise type label and SNR level for each combination of noise type and SNR. A code or symbol may be formed for such combination. This may include any alpha-numeric code from 1 to N for example. Otherwise, the code could be more specific and include an index number (1 to N) for noise types and another value that represents or is the value of the SNR, This is repeated for each context. During implementation, this code may be used to look up the data of the context when it is matched to input.

Process 600 may include "calculate context parameters" 612. Also as mentioned, this operation may be performed before deployment but could alternatively be performed during run-time. When performed before deployment, curves are fit to each of the speaker score distributions for each or individual contexts, and the parameters of the fits curve can then be stored as part of the context index listings in the context database. By one example, Gaussian curve fitting is performed and the context parameters for each context (or particularly for each score distribution for a context) then may be stored as part of the context.

Figure 7A:
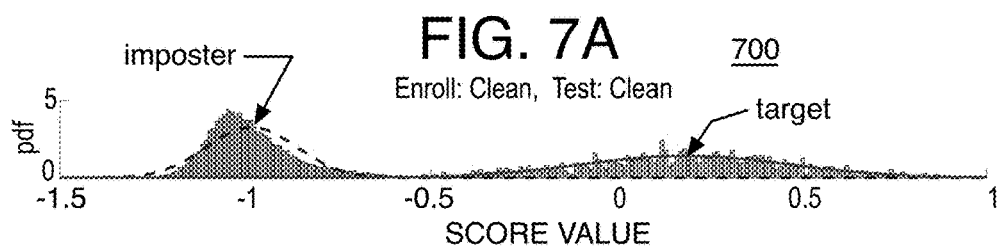
FIGS. 7A-7R are score distribution graphs of a variety of contexts to explain at least some of the implementations of the method of speaker recognition with context aware confidence modeling described herein.
Figure 7B:
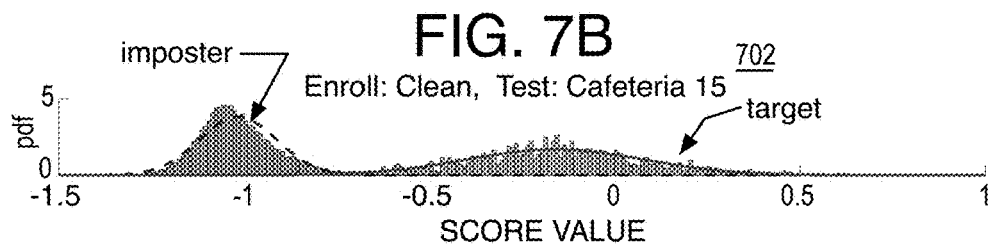
Figure 7C:
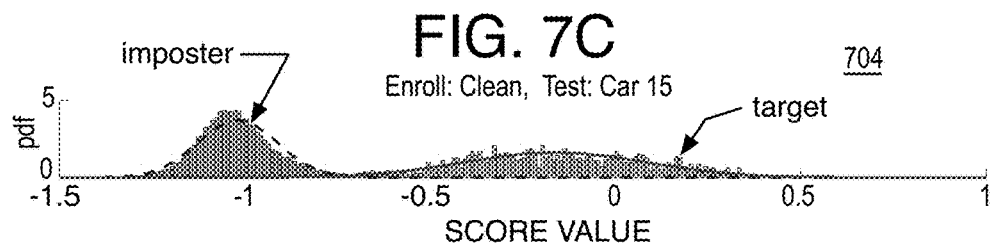
Figure 7D:
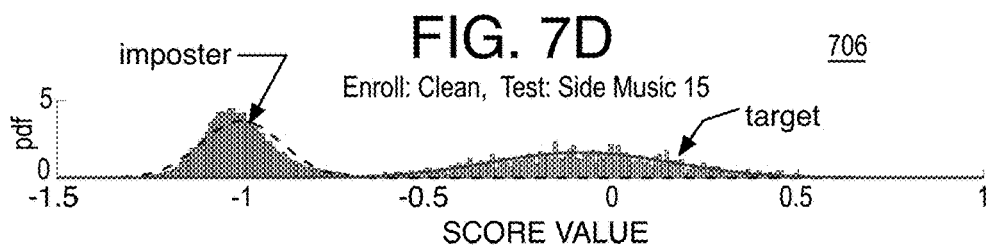
Figure 7E:
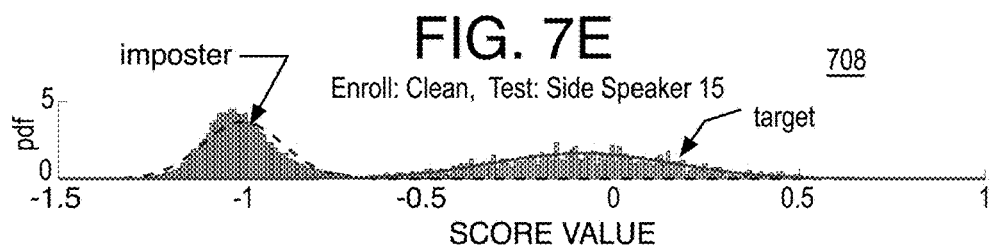
Figure 7F:
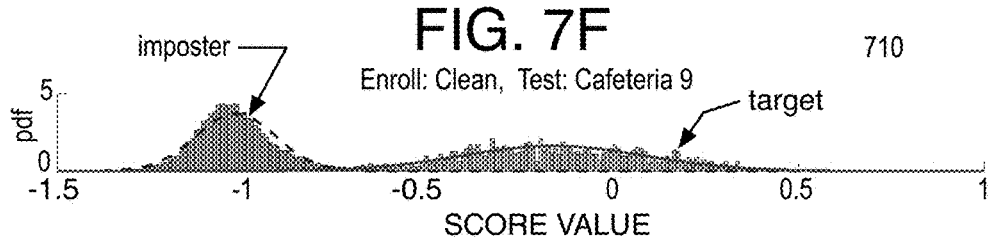
Figure 7G:
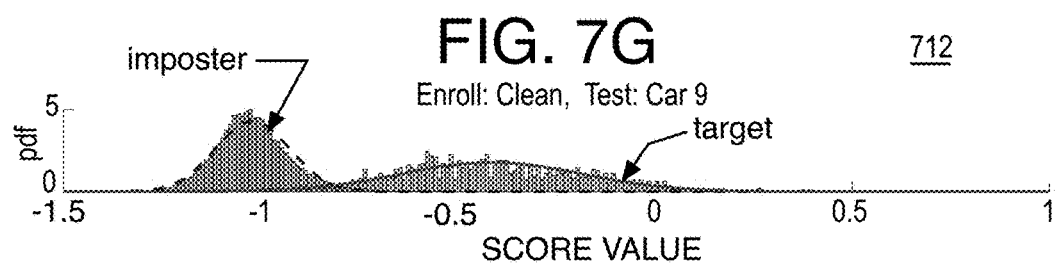
Figure 7H:
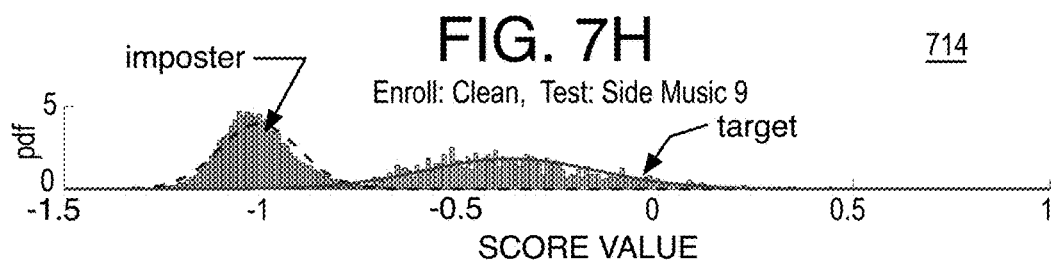
Figure 7I:
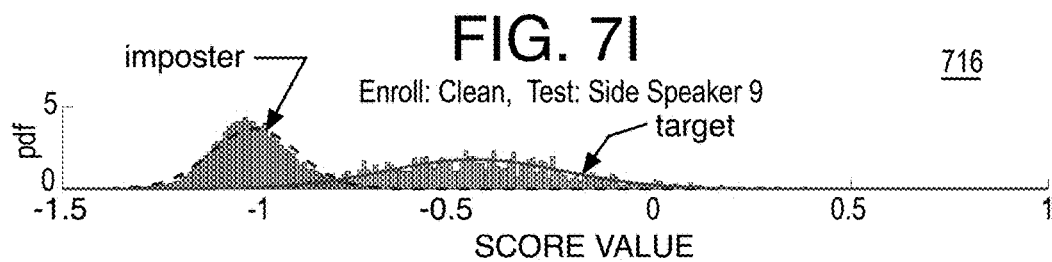

Referring to FIGS. 7A-7R, to have a clearer understanding of the curve fitting, target and impostor score distributions are shown for several experiments. The experiments were conducted with text-dependent SR for a short keyphrase, using a test corpus consisting of 20 speakers. The results shown on FIGS. 7A-7R is generated by using GMM-SVM. Several different algorithms were explored, however, and the patterns observed for each algorithm. Thus, other underlying SR algorithms could be used for the curve fitting as well. Here, FIGS. 7A-7I show trials 700 to 716 numbered evenly where each trial (or sample) has a different test condition, and where both the target and imposter score distributions are shown for each trial. For this set, speakers were enrolled in speaker models with clean utterances (Enroll: clean). The test noise conditions included: clean (700), cafeteria 15 (in other words, with SNR dB 15) (702), car 15 (704), side music 15 (706), side speaker 15 (708), cafeteria 9 (710), car 9 (712), music 9 (714), and side speaker 9 (716). In all test conditions, the impostor distributions were more or less the same. However, the mean and variance of target distributions were different for every test condition. For the trials 718 to 734 numbered evenly of FIGS. 7J-7R, the enrollment condition also was non-clean, and here was set at car 15 (SND dB as explained with the other tests). The test condition for each trial was clean (718), cafeteria 15 (720), car 15 (722), side music 15 (724), side speaker 15 (second person talking) (726), cafeteria 9 (728), car 9 (730), side music 9 (732), and side speaker 9 (734). These tests show the distributions for when only one type of enrollment condition was used (rather than clean or multiple conditions in a single trial or test). Practically this situation might occur if enrollment speech was available from one session which has less than ideal SNR. In this example, the distributions for both target and imposter scores vary in every condition. From these figures, by placing fit curves onto the distributions (dashed line to show imposter, solid line to show target), it is can be seen that each speaker score distribution can be characterized with a few parameters of the fit curve, and specifically the mean and standard deviation of the curve, by one example. Thus, these parameters are used as the context parameters herein. Other probability density functions exist and may be used. They include logistic distribution and cosine distribution (with parameter locations and scales which are similar to mean and standard deviation.).

Process 600 may include "store data of context in context database and indexed by context" 614. Once (or as) the contexts are established, the context code may be listed in an index listing, and the associated data, or codes or addresses to obtain access to the data, may be stored in the context index listing database, such as database 422.

Referring to FIG. 8, example context index 850 shows one example context database entry line but many more will be present. The entries may be indexed by context or context identification code or symbol (or word). The context code may include both a code for noise type or noise label 854 and a code for SNR level 856 for example. A reverberation code also may be included if provided. The identification of the context score distribution of the context as imposter or target 852 also may be provided. The score distribution values 858 may be included as well as the audio signal data 860 that indicates the noise type and/or SNR. It will be understood then, that a single context entry could have two speaker score distribution entries, one for imposter and one for target speaker. Otherwise, a context could be listed multiple times, one for each score distribution provided. As mentioned, optionally context parameters 862 associated with each (target and imposter) speaker score distribution may be pre-stored on the context database. Otherwise, the context parameters may be stored in a different database of the FA/FR error model, or may be computed in real time instead during run-time and as needed. Many variations exist.

It will be understood that the development data used in estimating the default models and forming the initial context database can be shipped as part of the system which would include at least score, context and trial type (imposter or target) information for a number of the sample trials. This data may be used until the context database is updated as described above.

Figure 9:
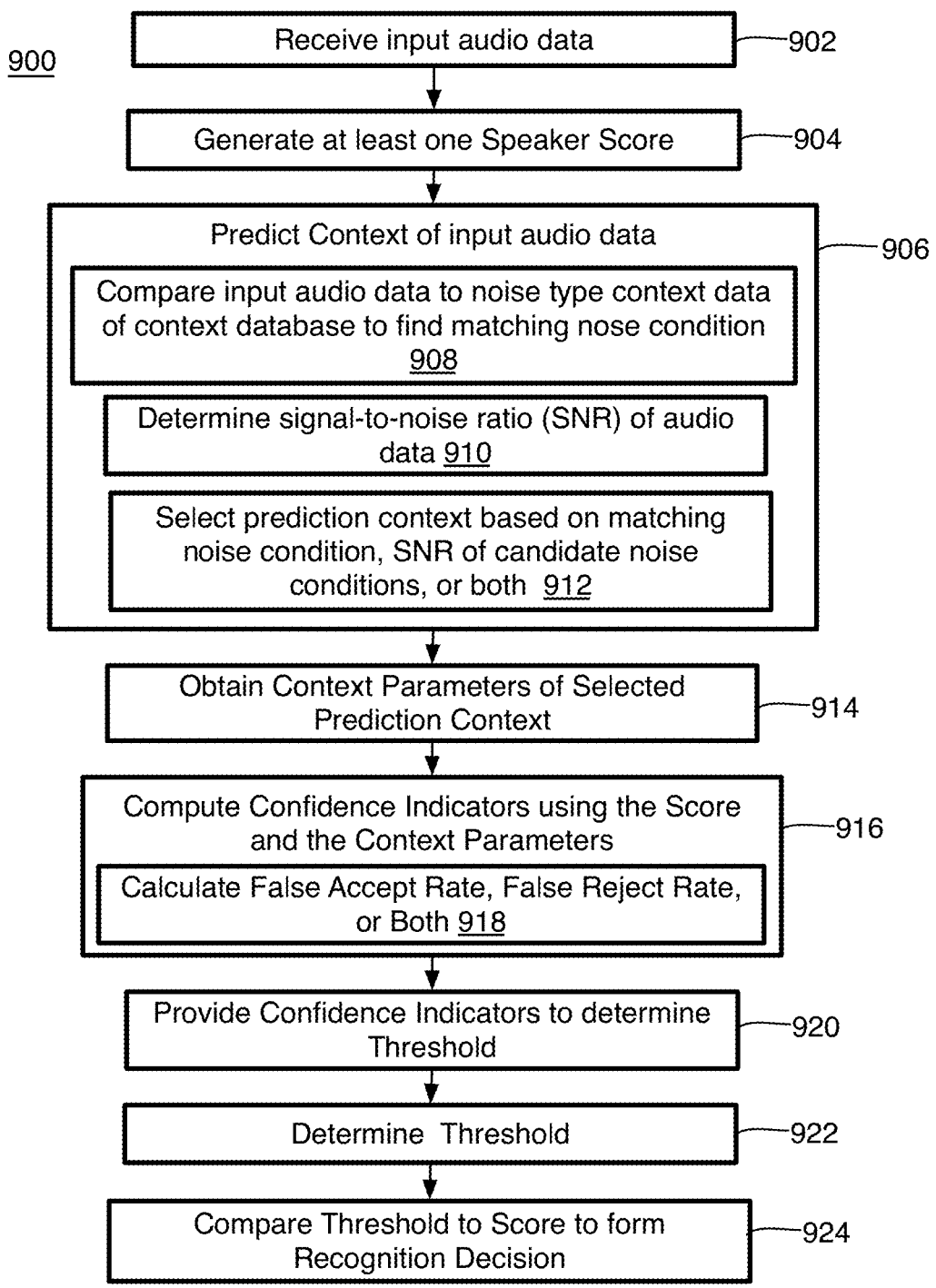
FIG. 9 is another flow chart of an example process for providing speaker recognition using context aware confidence modeling.

Referring to FIG. 9, an example process 900 of speaker recognition using context aware confidence modeling is arranged in accordance with at least some implementations of the present disclosure. Process 900 may include one or more operations 902-924 generally numbered evenly, and as illustrated in FIG. 9. Process 900 or portions thereof may be performed by a device or system (e.g., system 101, 200, 300, 400, 1100, or any other device or system discussed herein) to provide speaker recognition. Process 900 or portions thereof may be repeated for any amount or instances of received audio, for any number of target users, or the like.

Process 900 may include "receive input audio data" 902. For example, audio may be received via microphone 201 or the like and the received audio may be converted to audio data, an audio signal or the like. As discussed herein, the received audio may include an utterance or speech or the like and noise from the setting or acoustic environment of the device receiving the audio. This may include any pre-processing of the audio signal sufficient for accurate speaker recognition operations described herein. This also may include obtaining short samples of the audio, such as 25 ms samples, and by some set sampling frequency. The samples may be provided for both speaker score and context prediction.

Process 900 may include "generate at least one speaker score" 904, where a speaker recognition score may be determined corresponding to the received audio input. The speaker recognition score may be determined using any suitable technique or techniques. For example, samples of the audio data or an audio signal or the like corresponding to the received audio input may be processed to generate the speaker recognition score. In an implementation, features may be extracted from the audio data. Particularly, the features, feature vectors based on the features, a time series of such feature vectors, or the like may be processed based on a pretrained speaker model, pretrained classification model, or the like. For example, the pretrained speaker model may correspond to a target user based on the target user having previously performed a training protocol to generate the speaker model. The training protocol may include the user uttering particular phrases or the like to train the pretrained speaker model. Based on the application of the pretrained speaker model, a speaker recognition score may be provided, which provides a speaker recognition value or score or the like with a higher value corresponding to a higher likelihood the speaker of the received audio is the target user that trained the pretrained speaker model. Also, imposter speaker scores may be calculated and used to calculate final scores depending on the modeling strategy that is being used. Specifically, in some speaker modeling techniques, a final score is similar to a difference between a target model score and a background model score. The background model score might be thought of as an imposter score. Thus, a speaker score where the higher the score, the more likely an accept should occur, actually incorporates an imposter score in this way. This is true with methods that use a GMM. In other methods, such as SVM, there is no explicit background model.

As discussed, the speaker recognition techniques of process 900 may be provided for a single target user (e.g., a single speaker model for comparison of the received audio input). In an implementation, at operation 904, multiple (e.g., two or more) speaker recognition scores may be generated corresponding to the received audio input. For example, a second speaker recognition score may be generated based on the received audio input by applying a second pretrained speaker model corresponding to a second target user. For example, multiple users may pretrain corresponding speaker models based on the discussed training protocol or the like. Application of the second pretrained speaker model (e.g., different than the previously discussed pretrained speaker model) may generate a second speaker recognition score based on the received audio input. Such techniques may be repeated for any number of target users (e.g., two or more speaker recognition scores may be generated based on the same received audio input). In such multi-speaker recognition contexts, speaker recognition may include determining context-aware confidence scores for any target user or other techniques as discussed further herein with respect to operation 904.

Process 900 may include "predict context of input audio data" 906". While audio input samples are received to generate speaker scores, the samples of the audio input are also received for context prediction. Thus, process 900 may include "compare audio data to pre-stored noise type context data of context database to find matching noise condition" 908, where a noise type label may be generated corresponding to the received audio input. The noise type label may be generated using any suitable technique or techniques. For example, audio data or an audio signal or the like corresponding to the received audio input may be processed to generate the noise type label. In an implementation, generating the noise type label may include extracting features based on the received audio input and applying a pre-trained noise type or classification model to the extracted features to provide the noise type label. For example, any suitable model may be used for pretraining such as a machine learning model, mixture model, a Gaussian Mixture Model, an SVM, a DNN, or any other sufficient trained classifier that learns boundaries between the noise classes, or the like. For example, a noise type model may be pretrained based on the noise types sampled and recorded as mentioned above, where each noise type is considered a class (and may have sub-classes), which is also considered a context herein. Also as mentioned for the clustering approach, the output of the last hidden layer of the model is then used to compute and form distances to clusters during the pretraining. Predicting or generating the noise type label then may include applying the pretrained model to generate likelihood probabilities (or ratio scores) for the noise types supported by the pretrained model and selecting the noise type label corresponding to a highest likelihood probability the generated probabilities. The different types of noise types are as described above. By one example form, no matter the actual noise type of the audio input, even if the audio data provides a signal not encountered before and not expressly represented in the context database, the closest noise type in the context database will be selected as the noise type of the audio input.

Figure 10:
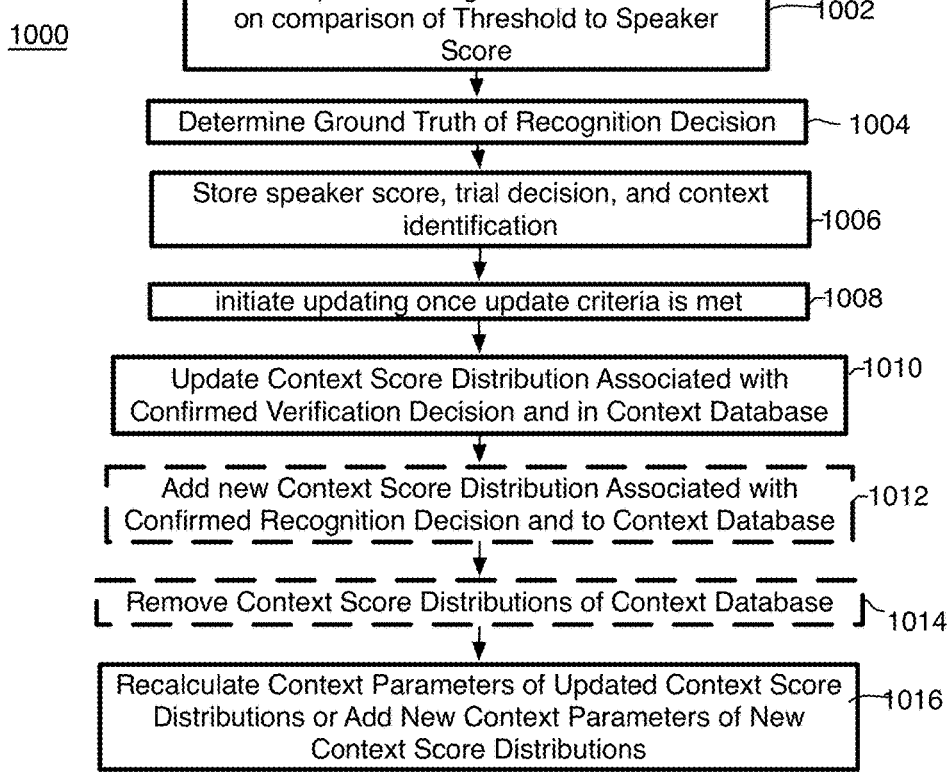
FIG. 10 is another flow chart of an example process for providing speaker recognition using context aware confidence modeling directed to adaption of a context database.

The context database may be adapted for such occurrence as explained below with process 1000 (FIG. 10).

Process 900 may include "determine speech-to-noise ratio (SNR) of audio data" 910, where a speech-to-noise ratio may be generated corresponding to the received audio input. The speech-to-noise ratio may be generated using any suitable technique or techniques. For example, audio data or an audio signal or the like corresponding to the received audio input may be processed to generate the speech-to-noise ratio. In an implementation, generating the speech-to-noise ratio may include extracting features based on the received audio input and applying a pre-trained classification model to the extracted features to identify the speech versus noise portions of the audio. For example, generating the speech-to-noise ratio may include classifying the received audio input as speech or noise. A VAD operation then may be performed to determine the ratio of power of speech to the power of the noise. Such classification of the received audio input as speech or noise by the SNR model may be performed using energy thresholding techniques, machine learning algorithms such as Gaussian Mixture Models (GMMs), Hidden Markov Models (HMMs), DNNs, phoneme forced-alignment from automatic speech recognition (ASR), or the like.

Process 900 may include "select prediction context based on matching noise condition, SNR of candidate noise conditions, or both" 912. The context with the matching noise type label is then looked up in the context database (and whether an imposter or a target is being looked up). As each context should have multiple SNR listings, by one form the context with the closest SNR to the SNR value of the audio input is selected as the context of the audio input. Other factors may be considered such as a reverberation value as mentioned above. Also as mentioned, other details of context prediction and a development corpus can be found in U.S. patent application Ser. No. 15/083,548, filed Mar. 29, 2016, which is incorporated herein in its entirety, for all purposes.

Process 900 may include "obtain context parameters of selected prediction context" 914. As mentioned, the context parameters of the score distributions associated with the selected context may be pre-computed and stored in the context database, where a different set of context parameters are available for the imposter score distribution and the target score distribution of the context. If not already provided, the identification of the context (or at least the noise type or noise type label) is used to obtain the score distribution associated with the context. An FA/FR error model then uses the score distribution to compute the context parameters by performing a curve fitting operation onto the score distribution. This maybe Gaussian and the context parameters may be the mean and standard deviation (or variance) of the fit curve. As mentioned, this should work for any noise types, and with this error model then, almost any conventional SR system can be transformed into a system that estimates FA and FR error rates using the SR score and contextual information.

Process 900 may include "compute confidence indicators using the speaker score and the context parameters". This may include the operation "calculate false accept rate, false reject rate, or both" 918, and by using the context parameters. Specifically, and as mentioned, one way of modeling target and imposter scores involves the assumption that the scores come from normal (Gaussian) distributions. Below is the classic cumulative density function (CDF) equation for the normal distribution:

$$F(s) = \Phi\left(\frac{s-\mu}{\sigma}\right) = \frac{1}{2}\left[1 + \text{erf}\left(\frac{s-\mu}{\sigma\sqrt{2}}\right)\right] \quad (1)$$

where s is the current single speaker score from the audio input, $\mu$ is mean or expectation of the score distribution, and $\sigma$ is standard deviation of the score distribution and that represents the pre-stored context score distribution, erf(x) is the error function and is defined as the probability of a random variable with normal distribution of mean 0 and variance ½ falling in the range [−x, x] given as:

$$\text{erf}(x) = \frac{1}{\sqrt{\pi}} \int_{-x}^{x} e^{-t^2} dt \quad (2)$$

where related to a score distribution, t is the frequency parameter of the Fourier transform. The CDF can then be approximated using an integration by parts approach using equation (1). Here is an example pseudocode that can be used for approximation:

```
//Calculating FA or FR
//x = (s − μ)/ σ√2
function CDF(x):
begin
        sum:=x;
        value:=x;
        for i:=1 to 100 do
            begin
                    value:=(value*x*x/(2*i+1));
                    sum:=sum+value;
            end;
        result:=0.5+(sum/sqrt(2*pi))*exp(−(x*x)/2);
end;
```

Referring to FIG. 9A, the equation and pseudo code above can be used to quantify FA and FR rates by using the collected target and imposter scores. Thus, as one example here on chart 900, the x axis has scores, shown between −5 and 5, and the right curve 952 illustrates the CDF of a normal distribution, and curve 952 can be used to quantify estimated FR rate on a given score. For estimating the FR rate, target scores are used to calculate the mean and variance of a normal distribution as described. The left curve 954 is 1-CDF of a normal distribution, and curve 954 can be used to quantify estimated FA rate on a given score. For estimating the FA rate, imposter scores are used to calculate the mean and variance of a normal distribution as mentioned above.

Once the FA and FR values are computed as the confidence indicators, process 900 then may include "provide confidence indicators to determine threshold" 920, such as providing access to the confidence values by an application that will generate the threshold to be compared to the speaker score to make a recognition decision. Thus, process 900 may include "determine threshold" 922. This may include performing calculations to determine a threshold using the confidence indicator, or may include looking up a pre-calculated threshold value on a table including associated possible confidence indicator values. As mentioned, the threshold also may be different depending on the intended use of the speaker recognition. For example, an application performing speaker recognition may have a corresponding security risk or ranking associated therewith such as high, medium, and low or the like. For example, for high security ranked applications a high threshold may be used, for low security ranked applications a lower threshold may be used, and so on. For example, for a biometric security application such as a login application, security access application, or the like a highest threshold may be used that corresponds to low or very low false accept rate (e.g., 5% or 2% or less) may be applied. For authenticated command applications such that a device may perform an action only if an utterance is deemed to be from a target user, a slightly lower threshold may be used that corresponds to a higher false accept rate (e.g., 5% or 10% or the like) may be applied. Other applications, such as speaker recognition used for speech recognition efficiency, for example, rather than security may be even lower.

Process 900 may include "compare threshold to score to form recognition decision" 924, where thereafter the threshold may be compared to the speaker score, whether for imposter or target. Thus, the speaker recognition performed may include any suitable speaker recognition operation or application such as user verification, user identification, or the like. In an implementation, speaker recognition may provide an accept or reject signal based on a comparison of the speaker recognition score and the threshold. In such contexts, an application may operate responsive to the accept or reject signal to allow access to a device (or memory of a device for example), allow acceptance of a login attempt or the like. For example, performing speaker recognition may include accepting the received audio input as corresponding to a target user when the speaker recognition score exceeds the threshold or rejecting the received audio input as corresponding to the target user when the speaker recognition score does not exceed the threshold.

In an implementation, speaker recognition may provide identification of a target user. For example, multiple speaker recognition scores (e.g., each for a separate target user) may be compared to the adaptive speaker recognition threshold and each other to provide speaker recognition. For example, such speaker recognition may provide a signal indicating a target user or users, if any, that pass speaker recognition or a target user, if any, that passes speaker recognition and has a highest speaker recognition score. For example, an identified speaker indicator or the like corresponding to the identified user may be provided. In such contexts, an application may operate responsive to the identified target user or speaker. For example, in the context of speech recognition (e.g., turning received speech into text), the speech recognition application may perform speech recognition using a user profile corresponding to the identified target user. In the context of authenticated command and control applications, the application may allow or disallow particular events based on a user profile corresponding to the identified target user. For example, some users may be able to perform actions and others may not.

Process 900 may be performed and/or repeated any number of times based on any suitable input or based on any suitable pattern. For example, process 900 may be performed responsive to an indicator of received audio, at regular intervals, or the like. Furthermore, some operations of process 900 may be performed responsive to other operations of process 900. For example, speaker recognition may be performed when there is a change in speech-to-noise ratio (e.g., a change greater than a threshold), a change of the noise type label change, a change in the score distributions of a context, a change in the speaker recognition application, or the like. As described below, the context database may be adaptive to implement some of these changes.

Referring to FIG. 10, an example process 1000 of a method of speaker recognition using context aware confidence modeling, and directed to an adaption of a context database, is arranged in accordance with at least some implementations of the present disclosure. Process 1000 may include one or more operations 1002-1016 generally numbered evenly, and as illustrated in FIG. 10. Process 1000 or portions thereof may be performed by a device or system (e.g., system 101, 200, 300, 400, 1100, or any other device or system discussed herein) to provide speaker recognition. Process 1000 or portions thereof may be repeated for any amount or instances of received audio, for any number of target users, or the like.

Process 1000 may include "obtain speaker recognition decision of trial based on comparison of threshold to speaker score" 1002. This refers to obtaining the result or prediction of the comparison of the speaker score to a threshold, and obtaining whether a current decision during run-time (after deployment) is an accept or reject. This may be performed for both target and imposter especially when the same imposter is frequently encountered by the system, such as a family member or co-worker that share use of the same system.

Process 1000 may include "determine ground truth of recognition decision" 1004. After a prediction is made, the host system (for example a personal assistant application) may determine if confirm whether this was a target or imposter trial by using a secondary recognition operation. either through dialog with the user or using other prediction modalities like biometrics such as face, person detection, skin print, etc., or entering a password. The dialog may include asking the speaker questions (whether on a screen showing text or by emitting audio questions or requests (on an electronic speaker system), and receiving answers from a speaker via audio through a microphone or by typing onto a screen). The dialog may include typical identifying questions such as place of birth or family event, mother's maiden name, and so forth, and may include psychology-based or other types of questions rather than just purely what is usually considered identification questions, but could include any other sort of identification in the dialog including the entry of one or more passwords. Otherwise, the password entry may be a logon to the system before or after the speaker recognition, and could be considered the main recognition test, as with any other secondary recognition operation, with the speaker recognition system herein being considered the secondary recognition test. Other tests that could be performed are face or person (body) detection which includes matching the shape of at least part of the body. A skin print test such as finger print, palm print, or other area of the skin could be used. Other bio-based tests may include retinal or other eye-based scan, body fluid tests, blood test, DNA test, and so on. Most or all of these tests use a database of identification data indicating particular speakers, and that are generated before deployment such as during an enrollment period for each speaker. Once the ground truth is confirmed for a trial (each round or individual decision), then the current trial may be used to update the context database eventually, and the process 1000 may include "store speaker score, trial decision, and context identification" 1006, and this may be considered to save the data in a trial database (and/or as part of the context database) and for later use. These data collection operations may be repeated for each trial or some sampling of trials as desired. Once a sufficient amount of data is collected, the context database may be updated as explained below.

Process 1000 may include "initiate updating once update criteria is met" 1008. Particularly, the data collection operations may continue during run-time so that data is collected for each context that is identified. The context database and the FA and FR error models can be updated with the stored data of individual contexts once a certain criteria is met. By one form, this is when some minimum number of trials are associated with a context, or when a sufficient total number of trials have run regardless of which contexts are identified. By other examples, the updating may occur at certain time intervals such as once a day or other time period. Another example criteria is when a sufficient number of trials are collected to form a context not well-represented by existing context. In the clustering approach, the criteria may be if a new cluster emerges that is far from existing clusters.

Once the criteria is met, process 1000 may include "update context score distribution associated with confirmed recognition decision and in context database" 1010. In this operation, a context is identified for updating by the stored context identification and trial type (imposter or target) for each speaker score saved. The speaker score is then added to the context score distributions of the associated context. This updates the context distributions based on actual recognition decisions, which in turn, were based on context aware confidence values. The result is a context database that adapts to the actual context.

Process 1000 may include "add new context score distribution associated with confirmed recognition decision and to context database" 1012. As mentioned, during pretraining of the noise type models to predict noise type, a feature space such as MFCC may be used. Particularly, each test utterance can be mapped to a number of MFCC vectors, and the system can construct a noise type model that describes a noise type. As mentioned, this may be an offline process that happens before deployment. During implementation, the SR system can continue to collect similar MFCC vectors, and the resulting probabilities (or likelihoods) obtained from the matching of input audio data to pre-stored noise type data during context prediction can be compared to a predetermined likelihood threshold. When the MFCCs do not reach the threshold at all, this suggests there is no matching context in the context database and a new context has been experienced. In this case, the system may collect MFCCs that failed to exceed the threshold, and may store them in a memory, such as "Unknown Context DB (UCDB)" by one possible example. It should be noted the highest probability, even if relatively low, still will indicate a matched context during run-time operations to keep the system running and while still using confidence indicators.

Offline of the run-time operations, the SR system, or another system, may apply clustering algorithms over the UCDB at regular intervals and have a criteria on cluster quality (how similar the elements are to each other) and on cluster quantity (how many elements are in the cluster) to decide on whether the system should create a new context. Once a new context is created, associated scores and ground truth information is used to create score distributions for the new context. During clustering, any distance metric may be used including Euclidean or Manhattan distance. Other variations for adding a new context may be understood and used here as well.

Process 1000 may include "remove context score distribution(s) of context database" 1014. By one form, after n number of new trial entries became available, the system disposes of the old target trial entries, removing these from the score distributions in the database, and re-models the imposter and target score distributions with the remaining entries. By another form, contexts that have not been used after a certain time period or number of trials may be entirely removed as well. Many other variations exist.

Process 1000 may include "recalculate context parameters of updated context score distributions or add new context parameters of new context score distributions" 1016. Thus, the updated score distributions then may be used by the FA and FR error model to compute new context parameters for the individual context score distributions. Going forward, the confidence model (or Fa and FR error rate estimate model) may use the updated context parameters, along with current speaker scores, to compute the confidence indicators in the form of the FA and FR rates. Fine-tuning the target and imposter score distributions using only the speakers the host system interacts with provides more accurate FA and FR error rate estimates. For example, when Gaussians are used in modeling, fine-tuned distributions would have less variance, essentially becoming much narrower.

Figure 11:
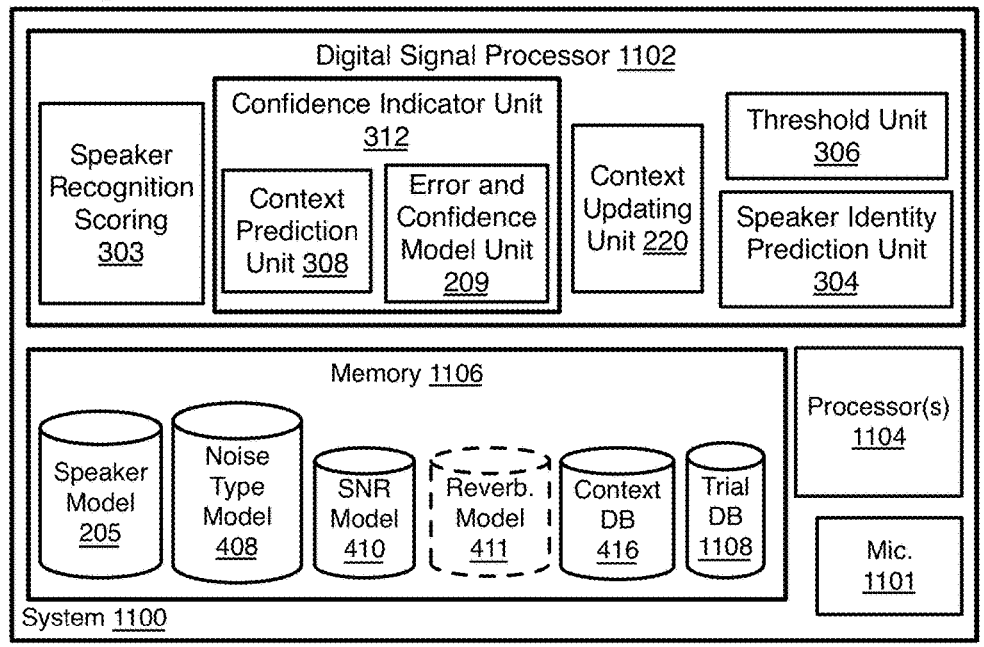
FIG. 11 is an illustrative diagram of an example system for providing speaker recognition.

FIG. 11 is an illustrative diagram of an example system 1100 for providing speaker recognition, arranged in accordance with at least some implementations of the present disclosure. As shown in FIG. 11, system 1100 may include at least one processor 1104, a digital signal processor 1102, a memory 1106, and microphone 1101. Also as shown, digital signal processor 1102 may include or implement speaker recognition scoring unit 303, confidence indicator unit 312, threshold unit 306 and speaker identity prediction unit 304. The confidence indicator unit 312 may have a context prediction unit 308 and error and confidence model unit 209, and a context updating unit 220 or 322 may be provided as well. Also as shown, memory 1106 may store speaker model(s) 205, noise type model 408, speech-to-noise ratio model 410, dereverberation model 411 when being used, context database 416 (where here it may be considered separate from the other model databases as one alternative), and a trial database 1108 to store updating data as described above. Memory 1106 also may store audio data, input audio data, audio features, accept/reject indicators, target user identifications, or any other data or data structures as discussed herein.

At least one processor 1104 may or may not be a central processor, and digital signal processor 1102 may include any number and type of processing units that may provide the operations as discussed herein. Such operations may be implemented via software or hardware or a combination thereof. For example, digital signal processor 1102 may include circuitry dedicated to manipulate data obtained from memory 1106 or dedicated memory. Furthermore, processor(s) 1104 may include any number and type of processing units or modules that may provide control and other high level functions for system 1100 as well as the operations as discussed herein. In the illustrated example, system 1100 may be configured to perform speaker recognition.

Memory 1106 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1106 may be implemented at least in part by cache memory. As shown, in an implementation, speaker recognition scoring module 303, confidence indicator unit 312, speaker identity prediction unit 304 and threshold unit 306 may be implemented via digital signal processor 1102 and/or via processor(s) 1104, and in other implementations, via one or more execution units (EU). The EU may include, for example, programmable logic or circuitry such as a logic core or cores that may provide a wide array of programmable logic functions.

The operation of the components of system 1100 are clear from the description of the systems and methods already described above. Thus, the components of system 1100 perform those functions of the operations mentioned above and by similarly named components of the systems described above.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
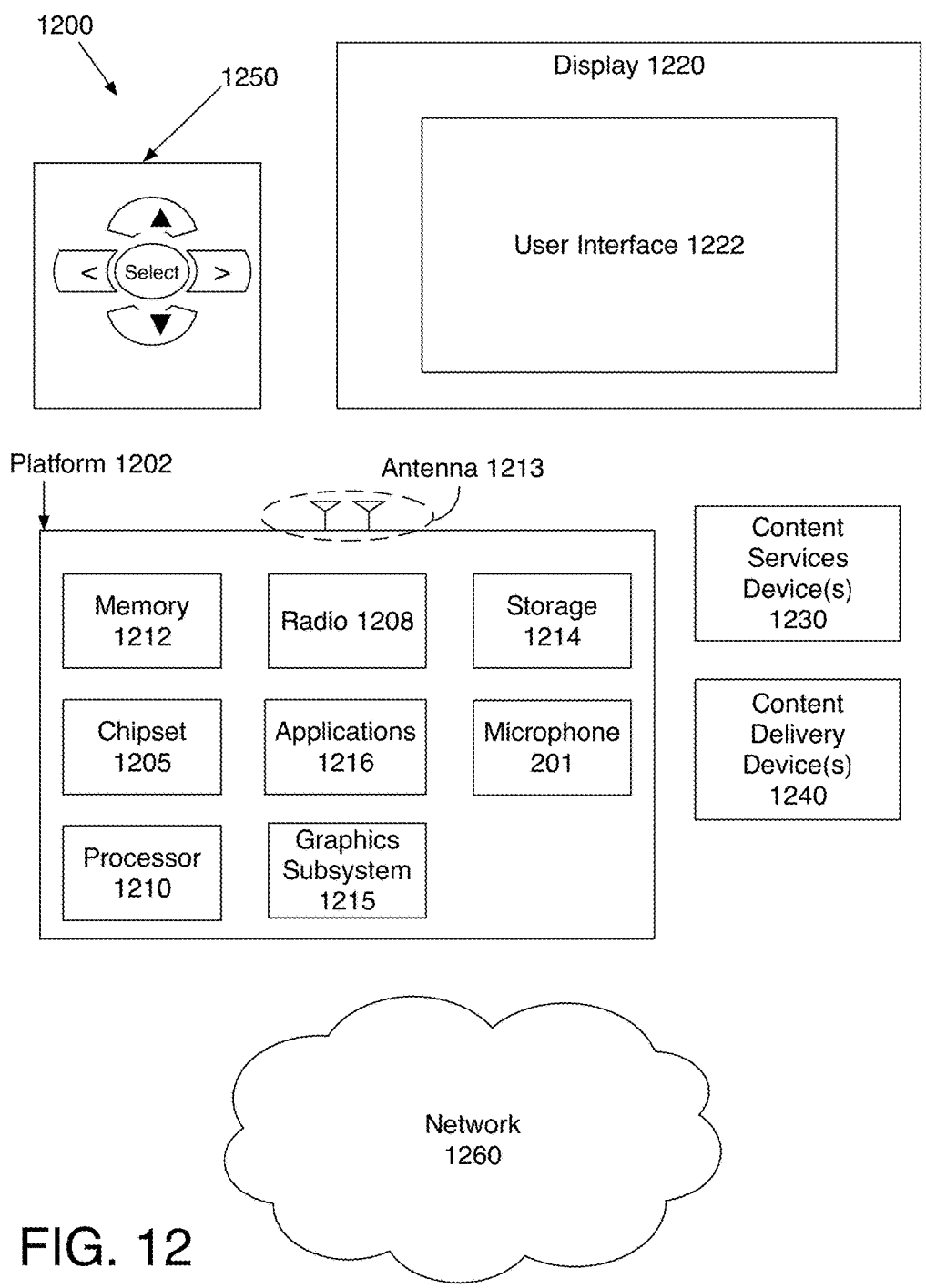
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. As shown, in some examples, system 1200 may include microphone 201 implemented via platform 1202. Platform 1202 may receive input speech via microphone 201 as discussed herein. A navigation controller 1250 including one or more navigation features may be used to interact with, for example, platform 1202 and/or display 1220. Each of these components is described in greater detail below.

In various implementations, system 1200 may provide speaker recognition as described. For example, speaker recognition may be provided for a device as described. In other implementations, system 1200 may provide for generating an adaptive speaker recognition threshold as discussed herein. Such training may be performed offline prior to speaker recognition for example.

In various implementations, platform 1202 may include any combination of a chipset 1205, processor 1210, memory 1212, antenna 1213, storage 1214, graphics subsystem 1215, applications 1216 and/or radio 12112. Chipset 1205 may provide intercommunication among processor 1210, memory 1212, storage 1214, graphics subsystem 1215, applications 1216 and/or radio 12112. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x126 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1215. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implements, the functions may be implemented in a consumer electronics device.

Radio 12112 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 12112 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various implements, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various implements, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various implements, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implements, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implements, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implements, however, are not limited to the elements or in the context shown or described in FIG. 12.

Figure 13:
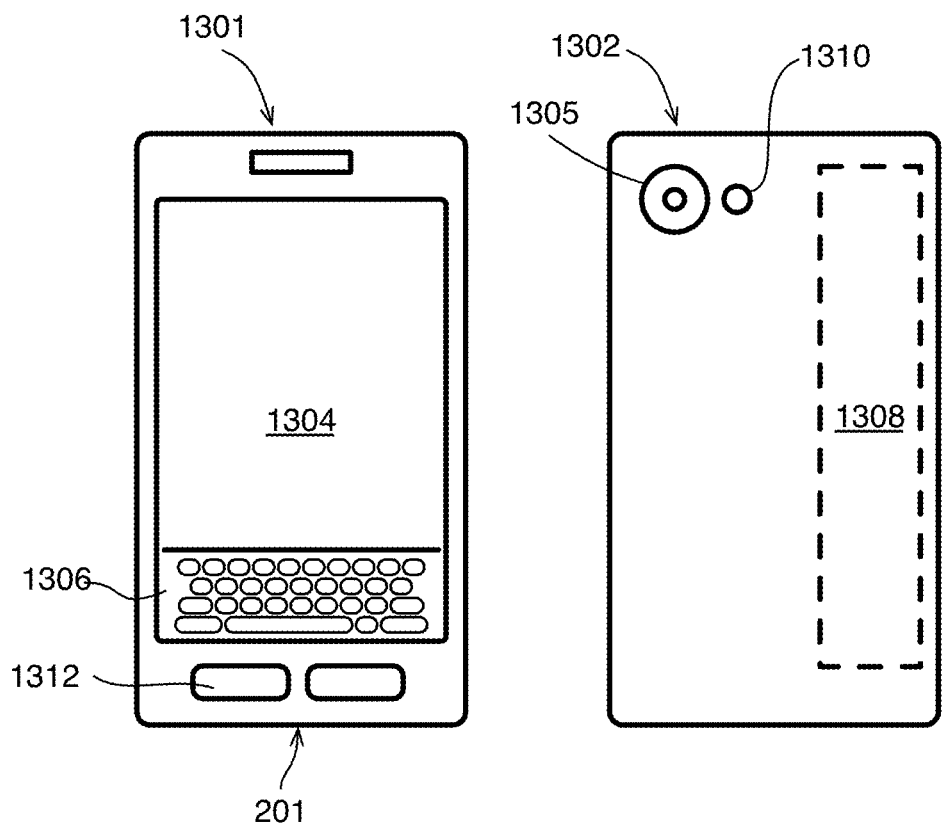
FIG. 13 illustrates an example device, all arranged in accordance with at least some implementations of the present disclosure.

As described above, system 1200 may be embodied in varying physical styles or form factors. FIG. 13 illustrates implementations of a small form factor device, arranged in accordance with at least some implementations of the present disclosure. In some examples, system 1100 or 1200 may be implemented via device 1300. In other examples, other devices or systems, or portions thereof may be implemented via device 1300. In various implements, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various implements, for example, a mobile computing device may be implemented as a smart phone capable of executing computer applications, as well as voice communications and/or data communications. Although some implements may be described with a mobile computing device implemented as a smart phone by way of example, it may be appreciated that other implements may be implemented using other wireless mobile computing devices as well. The implements are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone 201, or may be digitized by a voice recognition device. As shown, device 1300 may include a camera 1305 (e.g., including a lens, an aperture, and an imaging sensor) and a flash 1310 integrated into back 1302 (or elsewhere) of device 1300.

Various implements may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implement is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implement may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of speaker recognition comprising determining at least one current speaker score based on received audio input; predicting the context of the audio input comprising finding a match between data of the audio input and pre-stored context audio data associated with an acoustic environment context of a plurality of acoustic environment contexts, wherein the individual contexts are associated with a speaker score distribution and context parameters characterizing the speaker score distribution; and generating at least one context aware confidence indicator comprising a false accept rate-related value or a false reject rate-related value or both based, at least in part, on the current speaker score and the context parameters.

Otherwise, the method may include that using the false accept rate or false reject rate or both to determine a threshold to compare to the at least one current speaker score to decide whether a speaker of the audio input is an imposter or a true speaker; wherein the generating comprises using a cumulative density function (CDF) that uses the context parameters and the at least one current speaker score; wherein the context parameters comprise the mean and standard deviation of the context score distribution associated with the pre-stored context audio data matched to the data of the audio input; wherein individual acoustic environment contexts comprise at least different speech-to-noise ratios (SNRs); wherein the acoustic environment contexts each indicate at least one of: a location of the speaker; a location of the speaker comprising at least one of cafeteria noise and noise from inside a vehicle; an emotional state of the speaker; health of the speaker; a gender of the speaker; an age category of the speaker; any one or more of the above at an SNR level; wherein at least one of the acoustic environment contexts is associated with at least one reverberation component of the audio input. The method also may comprise forming a decision as to whether a speaker of the audio input is an imposter or a true speaker depending on comparison of a threshold determined, at least in part, by using at least one of the context aware confidence indicators and the at least one current speaker score; and using the decision to adaptively update at least the speaker score distribution associated with the decision; wherein using the decision comprises performing at least a secondary identification to determine the ground truth of the decision; and wherein the secondary identification comprises at least one of: at least one statement in response to a request for the statement given to a speaker of the audio input; face detection; person detection comprising visual detection of one or more body parts instead of, or in addition to, a face; skin print(s) comprising finger print(s); retinal scan(s); and receiving at least one password.

By yet another implementation, a computer-implemented system of speaker recognition comprises a memory configured to store a received audio input; and a digital signal processor coupled to the memory and to operate by: determining at least one current speaker score based on received audio input; predicting the context of the audio input comprising finding a match between data of the audio input and pre-stored context audio data associated with an acoustic environment context of a plurality of acoustic environment contexts, wherein the individual contexts are associated with a speaker score distribution and context parameters characterizing the speaker score distribution; and generating at least one context aware confidence indicator comprising a false accept rate-related value or a false reject rate-related value or both based, at least in part, on the current speaker score and the context parameters.

By another example, the system provides that wherein the digital signal processor is to operate by using the false accept rate or false reject rate or both to determine a threshold to compare to the at least one current speaker score to decide whether a speaker of the audio input is an imposter or a true speaker; wherein the generating comprises using a cumulative density function (CDF) that uses the context parameters and the at least one current speaker score; wherein the digital signal processor is to operate by: forming a decision as to whether a speaker of the audio input is an imposter or a true speaker; and using the decision to adaptively update at least the context score distribution associated with the decision; wherein at least one score point is added to the context score distribution used to determine the decision to form an updated context score distribution; wherein the context parameters of the updated context score distribution are determined and stored in association with the updated score distribution to form further confidence indicators; wherein the context score distributions are updated after a certain time period; wherein a context score distribution is updated after a certain minimum number of decisions; wherein the digital signal processor is to operate by: adding new context score distributions determined by using a threshold during context prediction; wherein context scores used to update context score distributions are dropped from the context database after a minimum number of decisions or after a certain time period; wherein the plurality of context score distributions comprises context score distributions that indicate an imposter; wherein the plurality of context score distributions are stored in a database wherein individual context score distributions are stored with associated context type indicator, and decision type indicating either imposter or true speaker; wherein the digital signal processor is to operate by: confirming the ground truth of the decisions; and if confirmed, saving the speaker score, the decision result, and the identification of the context for future updating of the context database when an updating criteria is met.

By one approach, at least one machine readable medium comprises a plurality of instructions that, in response to being executed on a computing device, cause the computing device to operate by: determining at least one current speaker score based on received audio input; predicting the context of the audio input comprising finding a match between data of the audio input and pre-stored context audio data associated with an acoustic environment context of a plurality of acoustic environment contexts, wherein the individual contexts are associated with a speaker score distribution and context parameters characterizing the speaker score distribution; and generating at least one context aware confidence indicator comprising a false accept rate-related value or a false reject rate-related value or both based, at least in part, on the current speaker score and the context parameters By another approach, the instructions cause the computing device to operate including that wherein finding a match between the data of the audio input and data of a pre-stored context comprises finding a set of contexts of the same noise type and selecting the context from the set as a match with the audio input that has a speech-to-noise ratio that is closest to the speech-to-noise ratio of the audio input data.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of speaker recognition comprising:
   determining at least one current speaker score based on received audio input;
   predicting the context of the audio input comprising finding a match between data of the audio input and pre-stored context audio data associated with an acoustic environment context of a plurality of acoustic environment contexts, wherein the individual contexts are associated with a speaker score distribution and context parameters characterizing the speaker score distribution;
   generating at least one context aware confidence indicator comprising a false accept rate-related value or a false reject rate-related value or both based, at least in part, on the current speaker score and the context parameters;

forming a decision as to whether a speaker of the audio input is an imposter or a true speaker depending on comparison of a threshold determined, at least in part, by using at least one of the context aware confidence indicators and the at least one current speaker score; and using the decision to adaptively update at least the speaker score distribution associated with the decision.

2. The method of claim 1 comprising using the false accept rate or false reject rate or both to determine a threshold to compare to the at least one current speaker score to decide whether a speaker of the audio input is an imposter or a true speaker.

3. The method of claim 1 wherein the generating comprises using a cumulative density function (CDF) that uses the context parameters and the at least one current speaker score.

4. The method of claim 3 wherein the context parameters comprise the mean and standard deviation of the context score distribution associated with the pre-stored context audio data matched to the data of the audio input.

5. The method of claim 1 wherein individual acoustic environment contexts comprise at least different speech-to-noise ratios (SNRs).

6. The method of claim 1 wherein the acoustic environment contexts each indicate at least one of:
a location of the speaker;
a location of the speaker comprising at least one of cafeteria noise and noise from inside a vehicle;
an emotional state of the speaker;
health of the speaker;
a gender of the speaker;
an age category of the speaker;
any one or more of the above at an SNR level.

7. The method of claim 1 wherein at least one of the acoustic environment contexts is associated with at least one reverberation component of the audio input.

8. The method of claim 1 wherein using the decision comprises performing at least a secondary identification to determine the ground truth of the decision.

9. The method of claim 8 wherein the secondary identification comprises at least one of:
at least one statement in response to a request for the statement given to a speaker of the audio input;
face detection;
person detection comprising visual detection of one or more body parts instead of, or in addition to, a face;
skin print(s) comprising finger print(s);
retinal scan(s), and
receiving at least one password.

10. A system for performing speaker recognition comprising:
a memory configured to store a received audio input; and
a digital signal processor coupled to the memory and to operate by:
determining at least one current speaker score based on received audio input;
predicting the context of the audio input comprising finding a match between data of the audio input and pre-stored context audio data associated with an acoustic environment context of a plurality of acoustic environment contexts, wherein the individual contexts are associated with a speaker score distribution and context parameters characterizing the speaker score distribution;
generating at least one context aware confidence indicator comprising a false accept rate-related value or a false reject rate-related value or both based, at least in part, on the current speaker score and the context parameters;
forming a decision as to whether a speaker of the audio input is an imposter or a true speaker; and
using the decision to adaptively update at least the context score distribution associated with the decision.

11. The system of claim 10 wherein the digital signal processor is to operate by using the false accept rate or false reject rate or both to determine a threshold to compare to the at least one current speaker score to decide whether a speaker of the audio input is an imposter or a true speaker.

12. The system of claim 10 wherein the generating comprises using a cumulative density function (CDF) that uses the context parameters and the at least one current speaker score.

13. The system of claim 10, wherein at least one score point is added to the context score distribution used to determine the decision to form an updated context score distribution.

14. The system of claim 13, wherein the context parameters of the updated context score distribution are determined and stored in association with the updated score distribution to form further confidence indicators.

15. The system of claim 10, wherein the context score distributions are updated after a certain time period.

16. The system of claim 10, wherein a context score distribution is updated after a certain minimum number of decisions.

17. The system of claim 10, wherein the digital signal processor is to operate by:
adding new context score distributions determined by using a threshold during context prediction.

18. The system of claim 10 wherein context scores used to update context score distributions are dropped from the context database after a minimum number of decisions or after a certain time period.

19. The system of claim 10 wherein the plurality of context score distributions comprises context score distributions that indicate an imposter.

20. The system of claim 10 wherein the plurality of context score distributions are stored in a database wherein individual context score distributions are stored with associated context type indicator, and decision type indicating either imposter or true speaker.

21. The system of claim 10 wherein the digital signal processor is to operate by:
confirming the ground truth of the decisions; and
if confirmed, saving the speaker score, the decision result, and the identification of the context for future updating of the context database when an updating criteria is met.

22. At least one non-transitory machine readable medium comprising a plurality of instructions that, in response to being executed on a computing device, cause the computing device to operate by:
determining at least one current speaker score based on received audio input;
predicting the context of the audio input comprising finding a match between data of the audio input and pre-stored context audio data associated with an acoustic environment context of a plurality of acoustic environment contexts, wherein the individual contexts are associated with a speaker score distribution and context parameters characterizing the speaker score distribution;

generating at least one context aware confidence indicator comprising a false accept rate-related value or a false reject rate-related value or both based, at least in part, on the current speaker score and the context parameters;

forming a decision as to whether a speaker of the audio input is an imposter or a true speaker; and using the decision to adaptively update at least the context score distribution associated with the decision.

23. The machine readable medium of claim 22 wherein finding a match between the data of the audio input and data of a pre-stored context comprises finding a set of contexts of the same noise type and selecting the context from the set as a match with the audio input that has a speech-to-noise ratio that is closest to the speech-to-noise ratio of the audio input data.

* * * * *